(12) United States Patent
Takahashi et al.

(10) Patent No.: US 12,328,490 B2
(45) Date of Patent: Jun. 10, 2025

(54) ELECTRONIC DEVICE WITH ZOOM CONTROL

(71) Applicant: CANON KABUSHIKI KAISHA, Tokyo (JP)

(72) Inventors: Ryo Takahashi, Tokyo (JP); Junko Morikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 18/155,642

(22) Filed: Jan. 17, 2023

(65) Prior Publication Data

US 2023/0164435 A1    May 25, 2023

Related U.S. Application Data

(63) Continuation of application No. PCT/JP2021/025780, filed on Jul. 8, 2021.

(30) Foreign Application Priority Data

Jul. 22, 2020  (JP) .................... 2020-125163

(51) Int. Cl.
*H04N 23/63* (2023.01)
*H04N 23/45* (2023.01)
*H04N 23/667* (2023.01)
*H04N 23/69* (2023.01)
*H04N 23/698* (2023.01)

(52) U.S. Cl.
CPC ........... *H04N 23/45* (2023.01); *H04N 23/632* (2023.01); *H04N 23/667* (2023.01); *H04N 23/69* (2023.01); *H04N 23/698* (2023.01)

(58) Field of Classification Search
None
See application file for complete search history.

(56) References Cited

U.S. PATENT DOCUMENTS

| | | | |
|---|---|---|---|
| 2016/0316147 A1* | 10/2016 | Bernstein | H04N 23/90 |
| 2018/0070009 A1* | 3/2018 | Baek | H04N 23/90 |
| 2018/0152623 A1* | 5/2018 | Li | H04N 5/2628 |
| 2018/0196472 A1* | 7/2018 | Lee | G06F 3/0488 |
| 2020/0150387 A1 | 5/2020 | Kim et al. | |
| 2020/0267318 A1* | 8/2020 | Lee | H04N 23/69 |
| 2020/0267326 A1* | 8/2020 | Yim | H04N 23/57 |

(Continued)

FOREIGN PATENT DOCUMENTS

| | | |
|---|---|---|
| CN | 106454132 A | 2/2017 |
| CN | 107111214 A | 8/2017 |

(Continued)

*Primary Examiner* — Paul M Berardesca
(74) *Attorney, Agent, or Firm* — Canon U.S.A., Inc. IP Division

(57) ABSTRACT

An electronic device having a first surface on which a first lens and a second lens with a wider angle than the first lens is arranged and a second surface on which at least a third lens is arranged, the electronic device comprising control means for controlling a captured image of the first lens to be displayed in response to issuing an instruction to display a captured image of a lens on the first surface, and controlling a captured image at a second field angle wider than the first field angle to be displayed in response to issuing an instruction to display a captured image of a lens on the second surface.

16 Claims, 18 Drawing Sheets

(56) References Cited

U.S. PATENT DOCUMENTS

| | | | | |
|---|---|---|---|---|
| 2022/0116540 A1* | 4/2022 | Jia | ........................ | H04N 23/683 |
| 2023/0156326 A1* | 5/2023 | Funatsu | ................. | G03B 19/07 |
| | | | | 348/220.1 |
| 2023/0188826 A1* | 6/2023 | Wu | ........................ | H04N 23/80 |
| | | | | 348/222.1 |

FOREIGN PATENT DOCUMENTS

| | | | | |
|---|---|---|---|---|
| CN | 108353126 A | 7/2018 | | |
| CN | 108377322 A | 8/2018 | | |
| CN | 111294517 A | 6/2020 | | |
| JP | 2004061762 A | 2/2004 | | |
| JP | 2012222471 A | 11/2012 | | |
| JP | 2019054447 A | 4/2019 | | |
| KR | 20170020069 A | 2/2017 | | |
| WO | 2018017625 A1 | 1/2018 | | |
| WO | WO-2022201819 A1 * | 9/2022 | ............. | G03B 17/02 |

* cited by examiner

FIRST SURFACE

SECOND SURFACE

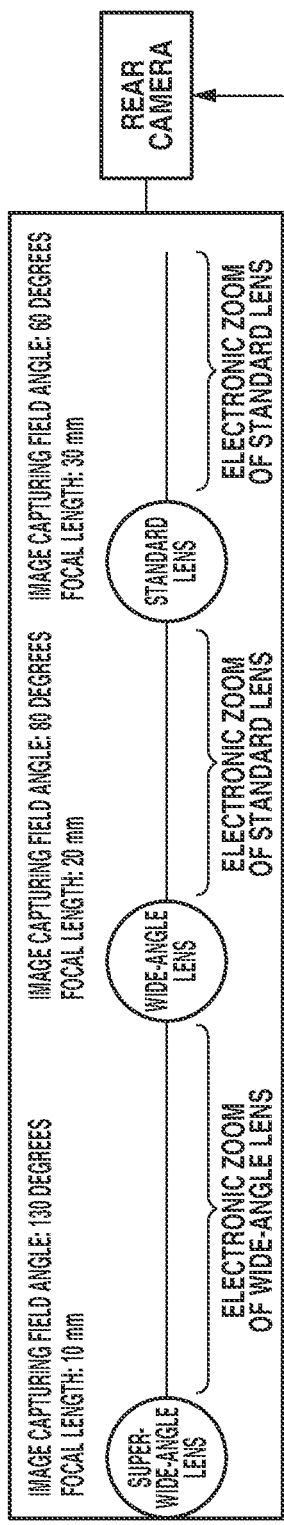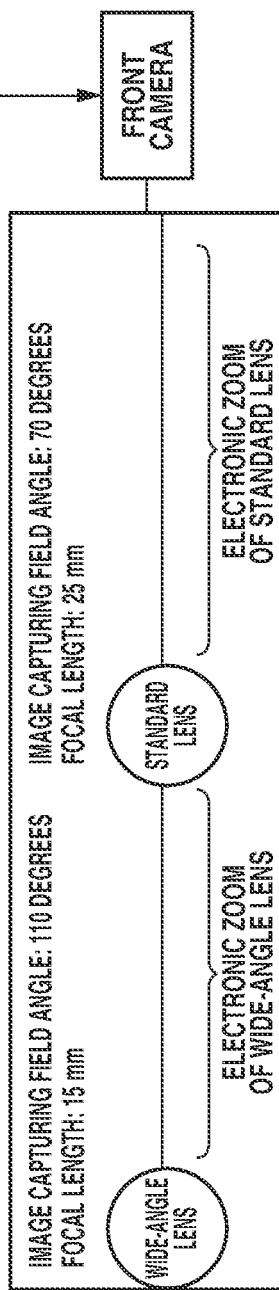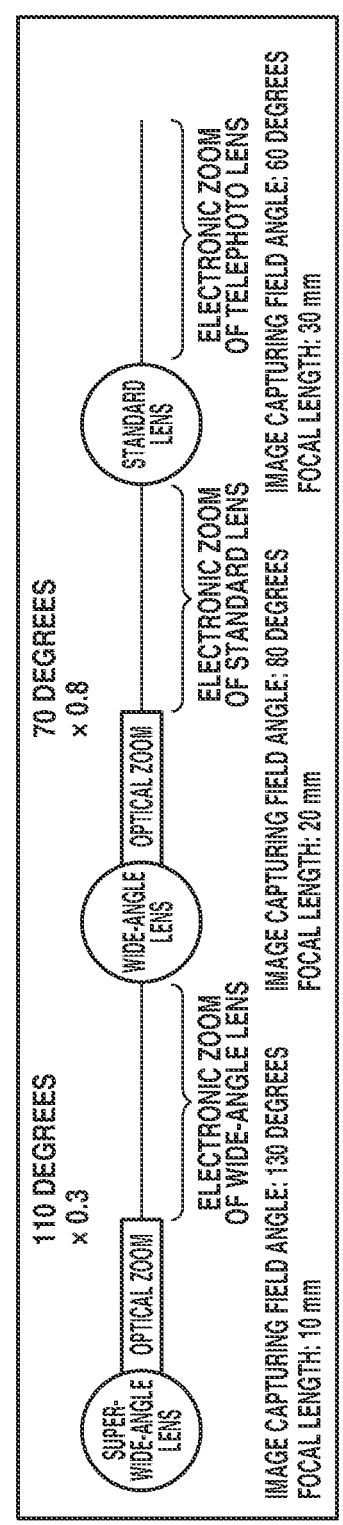
FIG. 3A
FIG. 3B

ELECTRONIC DEVICE WITH ZOOM CONTROL

CROSS-REFERENCE TO RELATED APPLICATIONS

This application is a Continuation of International Patent Application No. PCT/JP2021/025780, filed Jul. 8, 2021, which claims the benefit of Japanese Patent Application No. 2020-125163, filed Jul. 22, 2020, both of which are hereby incorporated by reference herein in their entireties.

BACKGROUND OF THE INVENTION

Field of the Invention

The present invention relates to an electronic device, a control method of the electronic device, and a storage medium, and relates particularly to a technique of performing image capturing via a plurality of lenses.

Background Art

There has been electronic devices that can perform image capturing from the rear side and the front side of the electronic device. PTL1 describes that a plurality of cameras can be moved in such a manner as to be arranged on both of the rear surface and the front surface of an electronic device.

CITATION LIST

Patent Literature

PTL1: Japanese Patent Application Laid-Open No. 2012-222471

The method described in PTL1 does not change a field angle in accordance with a direction that a camera faces, and thus a photographer might fail to swiftly perform image capturing at a field angle desired by the photographer, in a case where the photographer itself serves as a subject and desires to perform image capturing at a wide field angle.

SUMMARY OF THE INVENTION

In view of the above-described issues, the present invention provides an electronic device that can set a field angle with good operability in a case where a photographer itself serves as a subject.

To achieved the above-described purpose, an electronic device of the present invention is an electronic device having a first surface and a second surface, and includes lens switching means that can switch between image capturing performed using a first lens arranged on the first surface, and image capturing performed using a second lens being capable of executing image capturing at a wider angle than an angle of the first lens, first instruction means for issuing an instruction to display, on a display unit, a captured image acquired via a lens arranged on the first surface, second instruction means for issuing an instruction to display, on the display unit, a captured image acquired via a lens arranged on the second surface that at least includes a third lens, switching means that can switch, on the second surface, between image capturing at a first field angle and image capturing at a second field angle wider than the first field angle, and control means for controlling a captured image acquired via the first lens to be displayed on the display unit in a case where an instruction to display a captured image is issued by the first instruction means, and controlling a captured image at the second field angle to be displayed on the display unit in a case where an instruction to display a captured image is issued by the second instruction means.

Further features of the present invention will become apparent from the following description of exemplary embodiments with reference to the attached drawings.

BRIEF DESCRIPTION OF THE DRAWINGS

The attached drawings are included in the specification, constitute a part thereof, illustrate an exemplary embodiment of the present invention, and are used to describe the principle of the present invention together with the description thereof.

FIG. 3A is a diagram illustrating each lens unit of a smartphone 100 according to the present exemplary embodiment.

FIG. 3B is a diagram illustrating each lens unit of the smartphone 100 according to the present exemplary embodiment.

DESCRIPTION OF THE EMBODIMENTS

Hereinafter, a preferred exemplary embodiment of the present invention will be described with reference to the drawings.

Figure 1A:
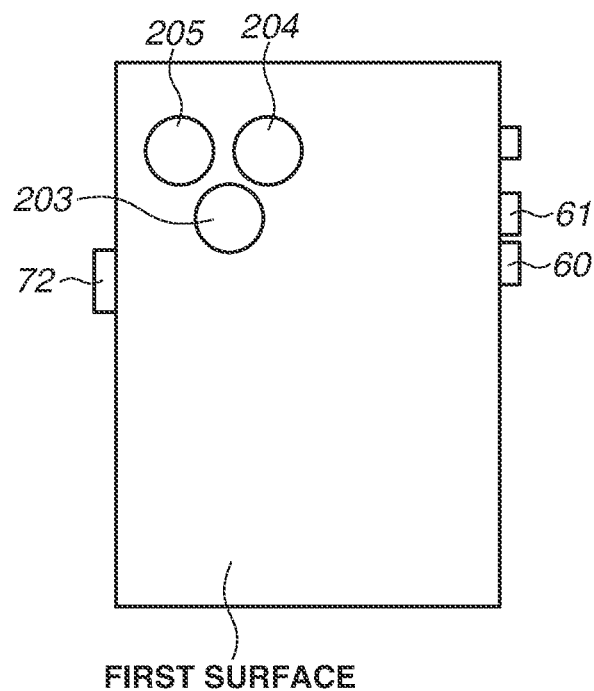
FIG. 1A is an external view of a smartphone serving as an example of an apparatus to which a configuration of the present exemplary embodiment can be applied.
Figure 1B:
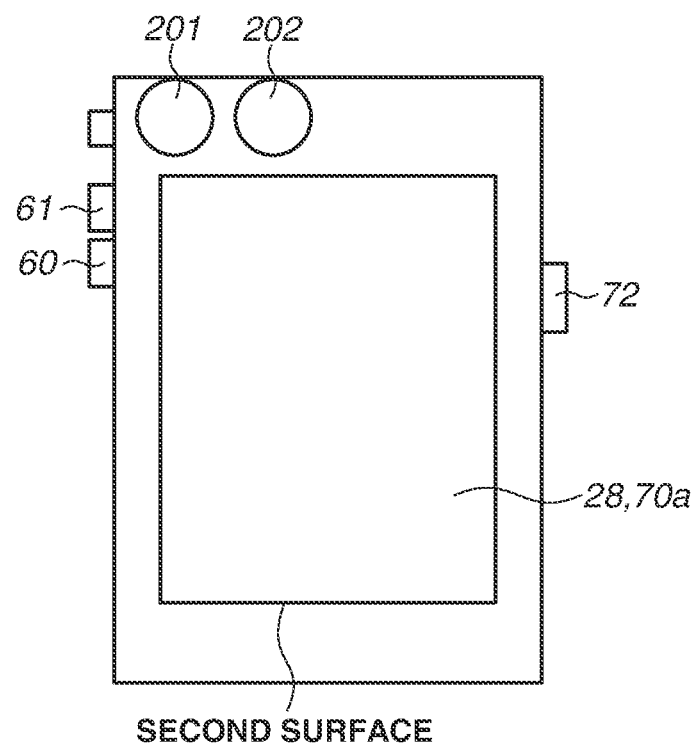
FIG. 1B is an external view of the smartphone serving as the example of the apparatus to which the configuration of the present exemplary embodiment can be applied.

FIGS. 1A and 1B are external views of a smartphone 100 serving as an example of an electronic device of the present invention. FIG. 1A illustrates a rear surface on an opposite side of a display surface of the smartphone 100, and FIG. 1B illustrates a display surface side of the smartphone 100.

A display unit 28 is a display unit that displays images and various types of information, and includes a touch panel 70a that can detect a touch operation performed on the display unit 28. An up key 61 is a button that can issue a volume increase instruction and an image capturing instruction. A down key 60 is a button that that can issue a volume decrease instruction, and a recording instruction of an image displayed on the display unit 28, by being pressed concurrently with a power switch 72. The power switch 72 is a push button for switching between power on and power off. Three lens units are arranged on a first surface (rear surface) being a side on which the display unit 28 of the smartphone 100 is not provided, and two cameras are arranged on a second surface (front surface) being a side on which the display unit 28 is provided. The respective focal lengths of lens units and cameras are different, and thus measures of field angles at which the lens units and the cameras can perform image capturing are different. By switching a lens between a lens arranged on the first surface and a lens arranged on the second surface, the user can change whether to stand on the display unit 28 side and capture an image including the user holding the smartphone 100. In addition, by using a lens arranged on the second surface, the user can perform image capturing while checking an image being captured, on the display unit 28.

Figure 2:
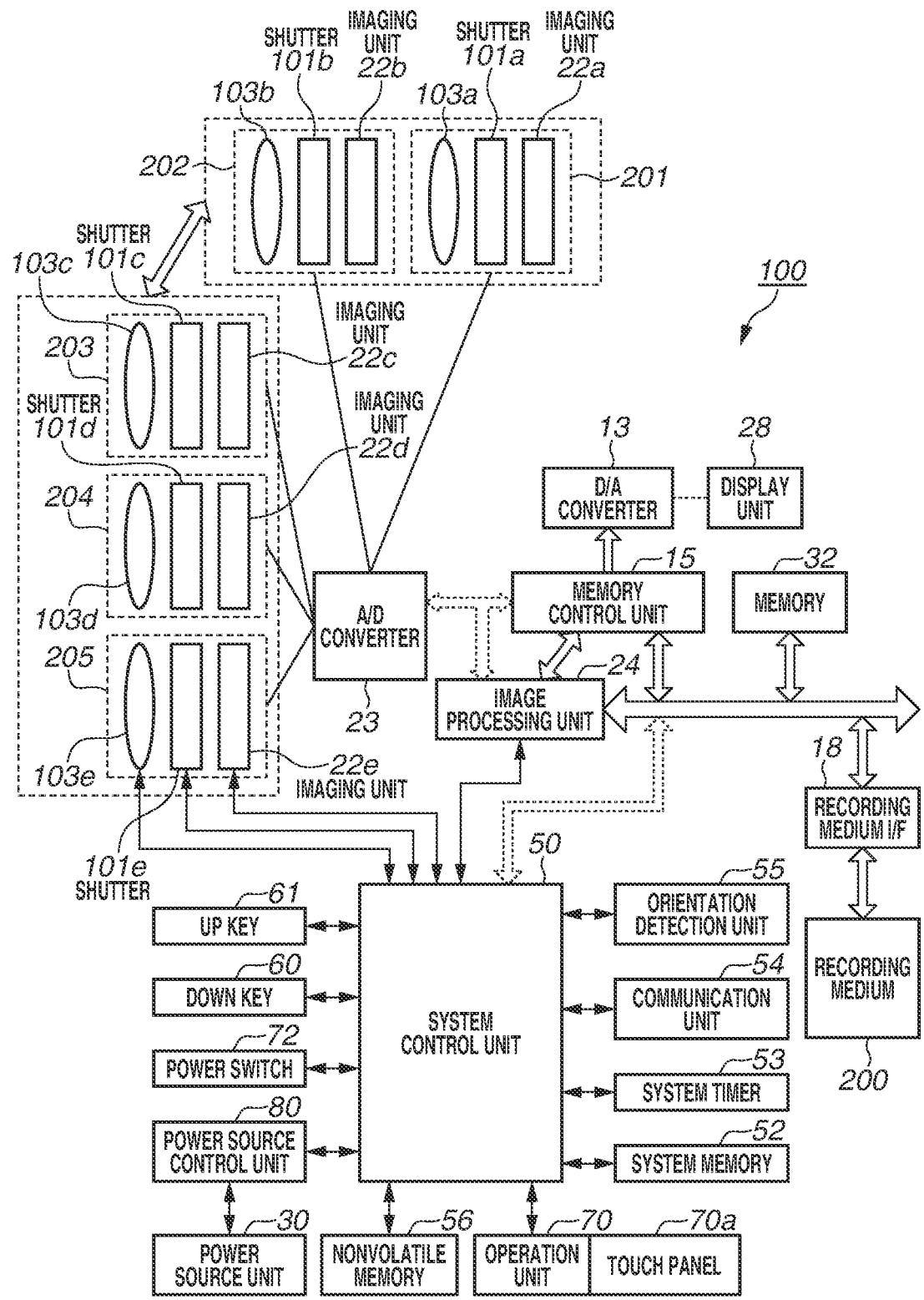
FIG. 2 is a block diagram illustrating a configuration example of a smartphone serving as an example of an apparatus to which a configuration of the present exemplary embodiment can be applied.

FIG. 2 is a block diagram illustrating a configuration example of the smartphone 100 according to the present exemplary embodiment.

The smartphone 100 includes lens units 201 to 205. The lens units 201 and 202 are arranged on the second surface, and the lens units 203, 204, and 205 are arranged on the first surface. Lenses 103a to 103e indicate lenses included in the respective lens units. Some of the lens units include a plurality of lenses, but FIG. 2 illustrates only one lens as a lens included in each lens unit, for the sake of simplification.

The lens unit 201 is a standard lens and the lens unit 202 is a wide-angle lens. When a lens of the lens unit 202 is used, it becomes possible to capture an image at a wider field angle than an image captured when a lens of the lens unit 201 is used. The lens unit 203 is a standard lens, the lens unit 204 is a wide-angle lens, and the lens unit 205 is a super-wide-angle lens. The lens unit 204 can capture an image at a wider field angle than the lens unit 203, and the lens unit 205 can capture an image at a wider field angle than the lens unit 204. Alternatively, in a case where lenses arranged on the first surface are a standard lens, a wide-angle lens, and a telephoto lens, the following configuration is employed.

The lens unit 201 is a standard lens and the lens unit 202 is a wide-angle lens. When a lens of the lens unit 202 is used, it becomes possible to capture an image at a wider field angle than an image captured when a lens of the lens unit 201 is used. The lens unit 203 is a telephoto lens, the lens unit 204 is a standard lens, and the lens unit 205 is a wide-angle lens. The lens unit 204 can capture an image at a wider field angle than the lens unit 203, and the lens unit 205 can capture an image at a wider field angle than the lens unit 204.

The following configurations are obtained as follows irrespective of the types of lenses arranged on the first surface.

Shutters 101a to 101e are shutters having a diaphragm function. Imaging units 22a to 22e are image sensors each including a charge-coupled device (CCD) sensor or a complementary metal-oxide semiconductor (CMOS) sensor that converts an optical image into an electric signal. An analog-to-digital (A/D) converter 23 is used to convert analog signals output from the imaging units 22 into digital signals.

A CCD sensor or a CMOS sensor is typically used for the image sensors. The image sensors photoelectrically convert a subject image formed on the image sensors through the lens units 201 to 205, and output the converted subject image as an electric signal.

An image processing unit 24 performs resize processing, such as predetermined pixel interpolation or reduction, and color conversion processing, on data from the A/D converter 23 or data from a memory control unit 15. The image processing unit 24 also performs predetermined calculation processing using data of a captured image. A system control unit 50 performs exposure control and ranging control based on the obtained calculation result. Through-the-lens (TTL) system autofocus (AF) processing, autoexposure (AE) processing, and electronic flash pre-emission (EF) processing are thereby performed. The image processing unit 24 further performs predetermined calculation processing using data of a captured image, and also performs TTL system automatic white balance (AWB) processing based on the obtained calculation result.

Output data from the A/D converter 23 is directly written into a memory 32 via the image processing unit 24 and the memory control unit 15, or via the memory control unit 15. The memory 32 stores image data obtained by the imaging unit 22 and converted by the A/D converter 23 into digital data, and image data to be displayed on the display unit 28. The memory 32 has a storage capacity sufficient for storing a predetermined number of still images, and a predetermined time length of a moving image and voice.

A power source control unit 80 includes a battery detection circuit, a direct current (DC)-DC converter, and a switch circuit for switching a block to be supplied with power. The power source control unit 80 detects whether a battery is attached, the type of the battery, and remaining battery capacity. The power source control unit 80 also controls the DC-DC converter based on the detection result and an instruction from the system control unit 50, and supplies necessary voltage to components including a recording medium 200, for a necessary time period. If the power switch 72 is long-pressed (continuously pressed for more than a predetermined time such as two or three seconds), it is possible to switch between ON and OFF of the power of the smartphone 100. In addition, if the power switch 72 is pressed for a short period smaller than the predetermined time, it is possible to switch between a nondisplay state and a display state of the display on the display unit 28.

A power source unit 30 includes a primary battery, such as an alkaline battery or a lithium battery, a secondary battery, such as a nickel-cadmium (NiCd) battery, a nickel-metal hydride (NiMH) battery, or a lithium (Li) battery, and an alternating current (AC) adapter.

A recording medium interface (I/F) 18 is an interface to the recording medium 200, such as a memory card or a hard disc. The recording medium 200 is a recording medium, such as a memory card, for recording captured images, downloaded music, and videos, and includes a semiconductor memory or a magnetic disc.

A communication unit 54 is connected wirelessly or via a wired cable, and transmits or receives a video signal and an audio signal. The communication unit 54 can also be connected with a wireless local area network (LAN) and the Internet. The communication unit 54 can transmit an image (including a live view) captured by the imaging unit 22 and an image recorded on the recording medium 200. The communication unit 54 can also receive image data and other various types of information from an external device.

An orientation detection unit 55 detects the orientation of the smartphone 100 with respect to a direction of gravitational force. Based on the orientation detected by the orientation detection unit 55, it can be determined whether an image captured by the imaging unit 22 is an image captured with the smartphone 100 being held in a traverse direction or an image captured with the smartphone 100 being held in a longitudinal direction. The system control unit 50 can add orientation information corresponding to the orientation detected by the orientation detection unit 55, to an image file of an image captured by the imaging unit 22, or record an image with being rotated. As the orientation detection unit 55, an acceleration sensor or a gyro sensor can be used.

A system timer 53 is a time measuring unit for measuring a time used for various types of control or a time of a built-in clock.

A down key 60, an up key 61, and an operation unit 70 function as operating means for inputting various operation instructions to the system control unit 50.

Constants and variables for operating the system control unit 50, and programs read out from a nonvolatile memory 56 are loaded onto a system memory 52. The system control unit also performs display control by controlling the memory 32, a digital-to-analog (D/A) converter 13, and the display unit 28 by using a random access memory (RAM).

The nonvolatile memory 56 is a memory electrically-erasable/recordable by the system control unit 50, and for example, an electrically erasable programmable read-only memory (EEPROM) is used for the nonvolatile memory 56. Constants for operating the system control unit 50 and programs are stored in the nonvolatile memory 56. Herein, the programs refer to programs for executing various flowcharts to be described below in the present exemplary embodiment.

The system control unit 50 includes at least one processor, and controls the entire smartphone 100. The system control unit 50 implements each piece of processing in the present exemplary embodiment, which will be described below by executing the above-described program recorded in the nonvolatile memory 56.

The operation unit 70 includes the touch panel 70a that can detect a touch operation, and a switch for switching a mode to a silent mode. The operation unit 70 further includes the up key 61, the down key 60, and the power switch 72.

The memory 32 also serves as a memory (video memory) for image display. The D/A converter 13 converts data for image display that is stored in the memory 32, into an analog signal, and supplies the analog signal to the display unit 28. The image data for display that is written into the memory 32 in this manner is displayed by the display unit 28 via the D/A converter 13. The display unit 28 performs display according to the analog signal from the D/A converter 13, on a display device, such as a liquid crystal display (LCD). The digital signals having been once A/D-converted by the A/D converter 23 and stored in the memory 32 are D/A-converted by the D/A converter 13, and sequentially transferred to the display unit 28 and displayed thereon. This enables a function as an electronic viewfinder to perform a live view display.

FIGS. 3A, 3B, 4A, and 4B are diagrams illustrating an image capturing field angle, a focal length, and a display magnification of each lens unit of the smartphone 100. FIGS. 3A and 3B illustrate a case where a rear camera on the first surface includes a super-wide-angle lens, a wide-angle lens, and a standard lens, and a front camera on the second surface includes a wide-angle lens and a standard lens.

FIG. 3A illustrates lenses included in each of the lens units corresponding to lens units (rear camera) on the first surface and lens units (front camera) on the second surface. In the lens units on the first surface, a super-wide-angle lens corresponding to the lens unit 205 has a focal length of 10 mm and an image capturing field angle of 130 degrees. In addition, a wide-angle lens corresponding to the lens unit 204 has a focal length of 20 mm and an image capturing field angle of 80 degrees, and a standard lens corresponding to the lens unit 203 has a focal length of 30 mm and an image capturing field angle of 60 degrees. In the lens units on the second surface, a wide-angle lens corresponding to the lens unit 202 has a focal length of 15 mm and an image capturing field angle of 110 degrees, and a standard lens corresponding to the lens unit 201 has a focal length of 25 mm and an image capturing field angle of 70 degrees.

In the lens units on the first surface, an image is captured by the lens unit 205 at an image capturing field angle of 130 degrees, and in a case where a designated image capturing field angle is smaller than 130 degrees and larger than 80 degrees, an image capturing field angle is narrowed using electronic zoom. If an image capturing field angle reaches an image capturing field angle of 80 degrees, image capturing switches to image capturing by a lens of the lens unit 204. Furthermore, an image is captured by the lens unit 204 at an image capturing field angle of 80 degrees, and in a case where a designated image capturing field angle is smaller than 80 degrees and larger than 60 degrees, an image capturing field angle is narrowed using electronic zoom. If a designated image capturing field angle reaches an image capturing field angle of 60 degrees, image capturing switches to image capturing by a lens of the lens unit 203. A designation method of an image capturing field angle will be described below. By switching a lens, the user can change a field angle of a captured image. In this manner, if a field angle change instruction is issued by the user, while using electronic zoom, a lens unit that performs image capturing is switched at a timing at which an instruction to change a field angle to an image capturing field angle at which a neighboring lens unit can perform image capturing is issued. Similarly, also in the case of the second surface, an image is captured by the lens unit 202 at an image capturing field angle of 110 degrees, and if a designated image capturing field angle becomes smaller than 110 degrees and larger than 70 degrees, an image capturing field angle is narrowed using electronic zoom. A captured image at a designated field angle (captured image via a lens suitable for a designated field angle) is displayed on the display unit 28. If a designated image capturing field angle reaches 70 degrees, image capturing switches to image capturing by a lens of the lens unit 201. In the present exemplary embodiment, each lens needs not be a single focus lens, and may have a configuration in which a lens position is changeable and optical zoom can be performed.

FIG. 3B is a diagram illustrating switching of a lens unit on the first surface that is performed in a case where a lens unit can perform optical zoom. In the lens units on the first surface, an image is captured by the lens unit 205 at an image capturing field angle of 130 degrees, and if a designated image capturing field angle becomes smaller than 130 degrees, optical zoom is initially performed by moving the position of a lens. Then, if a designated image capturing field angle reaches 110 degrees, an image capturing field angle is narrowed using electronic zoom. If the image capturing field angle reaches an image capturing field angle of 80 degrees, image capturing switches to image capturing by a lens of the lens unit 204. Furthermore, if a designated image capturing field angle becomes smaller than 80 degrees, an image capturing field angle is changed using optical zoom, and if a designated image capturing field angle becomes smaller than 70 degrees, electronic zoom is performed. If a designated image capturing field angle reaches 60 degrees, image capturing is performed using the lens unit 203. If a designated image capturing field angle becomes smaller than 60 degrees, electronic zoom is performed using the lens unit 203. A configuration may be employed in which only single focus lenses are used as lenses of a front camera on the second surface and lenses of a rear camera on the first surface can perform optical zoom. In addition, both in the case illustrated in FIG. 3A and the case illustrated in FIG. 3B, a timing at which a lens unit that performs image capturing is switched to scale back an image capturing field angle needs not be always consistent with a timing at which a lens unit is switched to scale up an image capturing field angle. A switch timing of a lens unit that performs image capturing may be changed in such a manner as to scale back the influence on a captured image, in accordance with an image capturing mode and an image capturing situation.

Figure 4A:
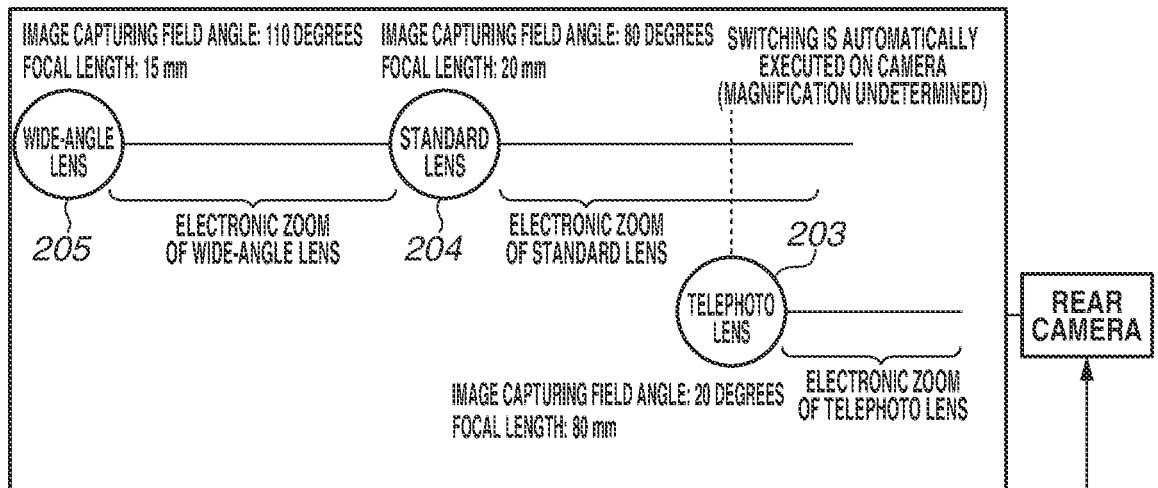
FIG. 4A is a diagram illustrating each lens unit of a smartphone 100 according to the present exemplary embodiment.
Figure 4A:
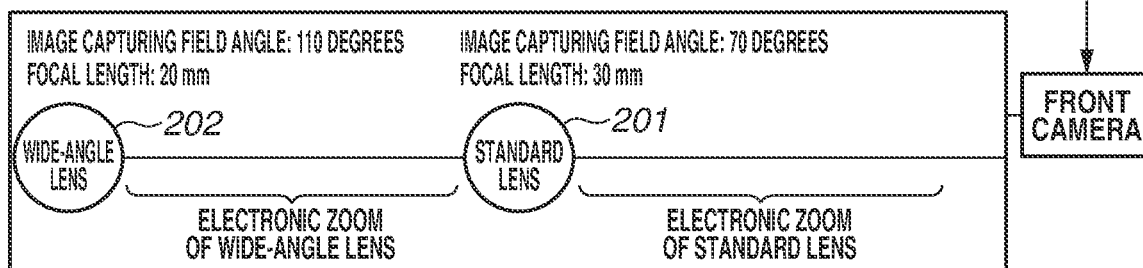
Figure 4B:
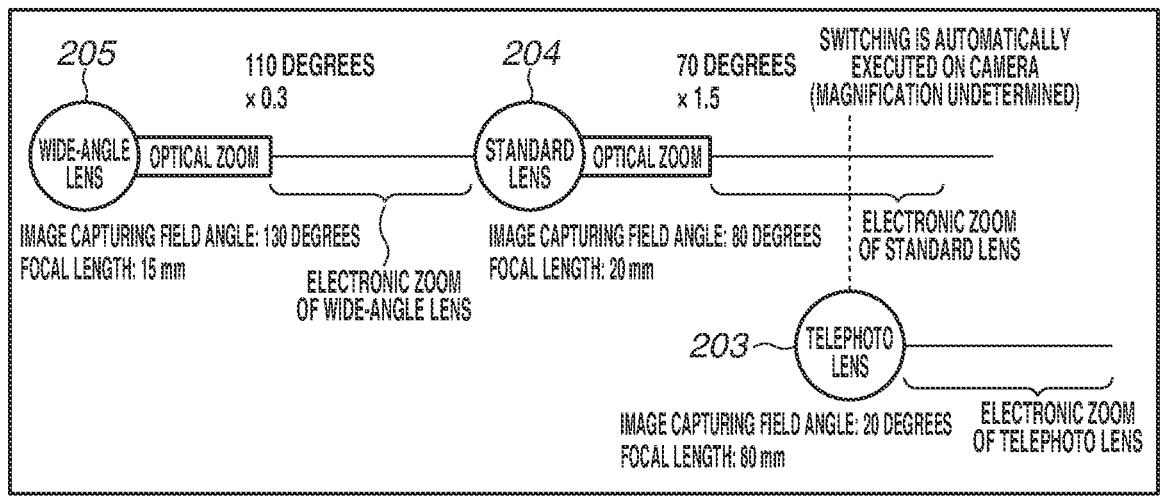
FIG. 4B is a diagram illustrating each lens unit of the smartphone 100 according to the present exemplary embodiment.
Figure 5A:
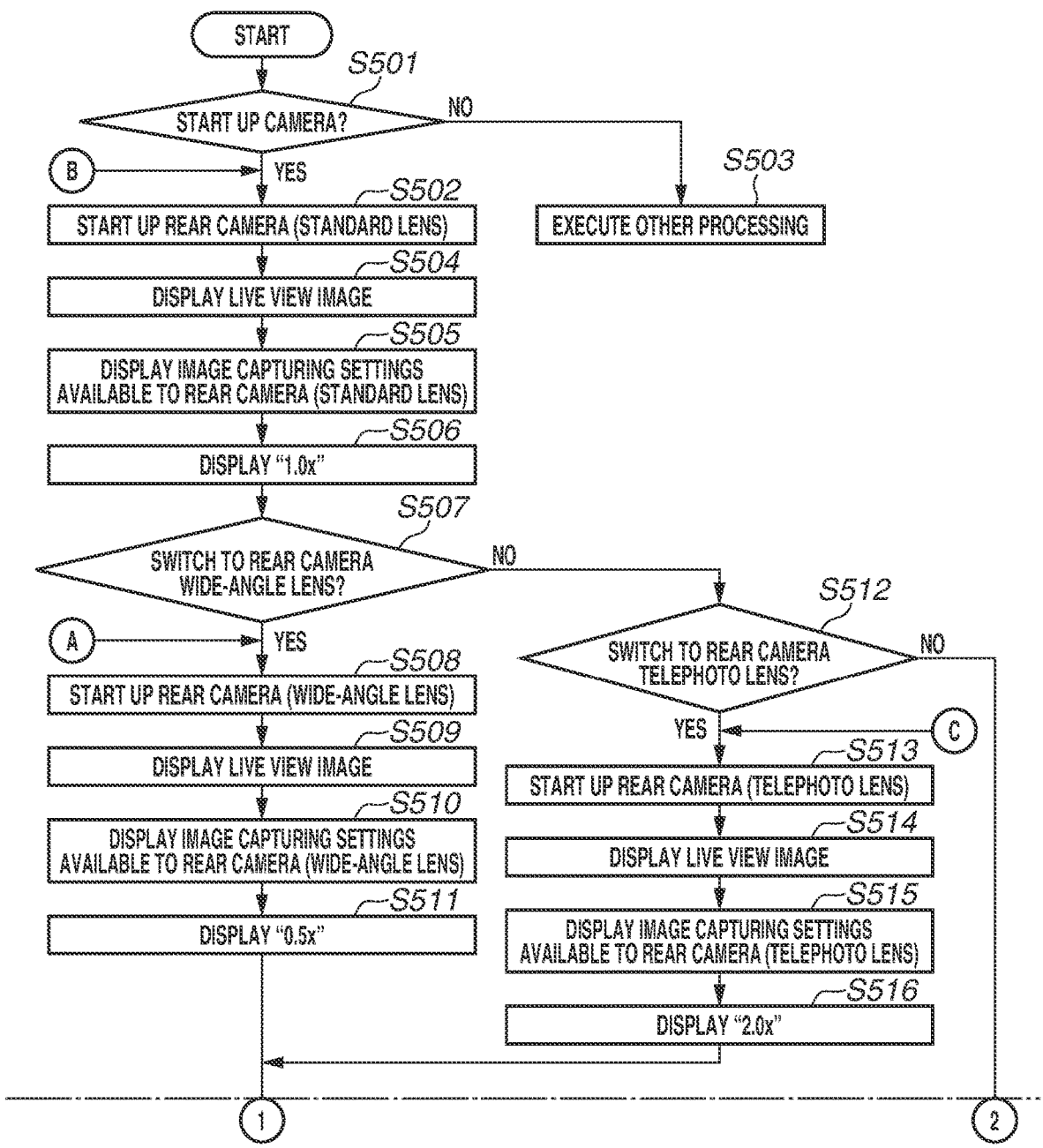
FIG. 5A is a flowchart illustrating image capturing control processing according to the present exemplary embodiment.
Figure 5B:
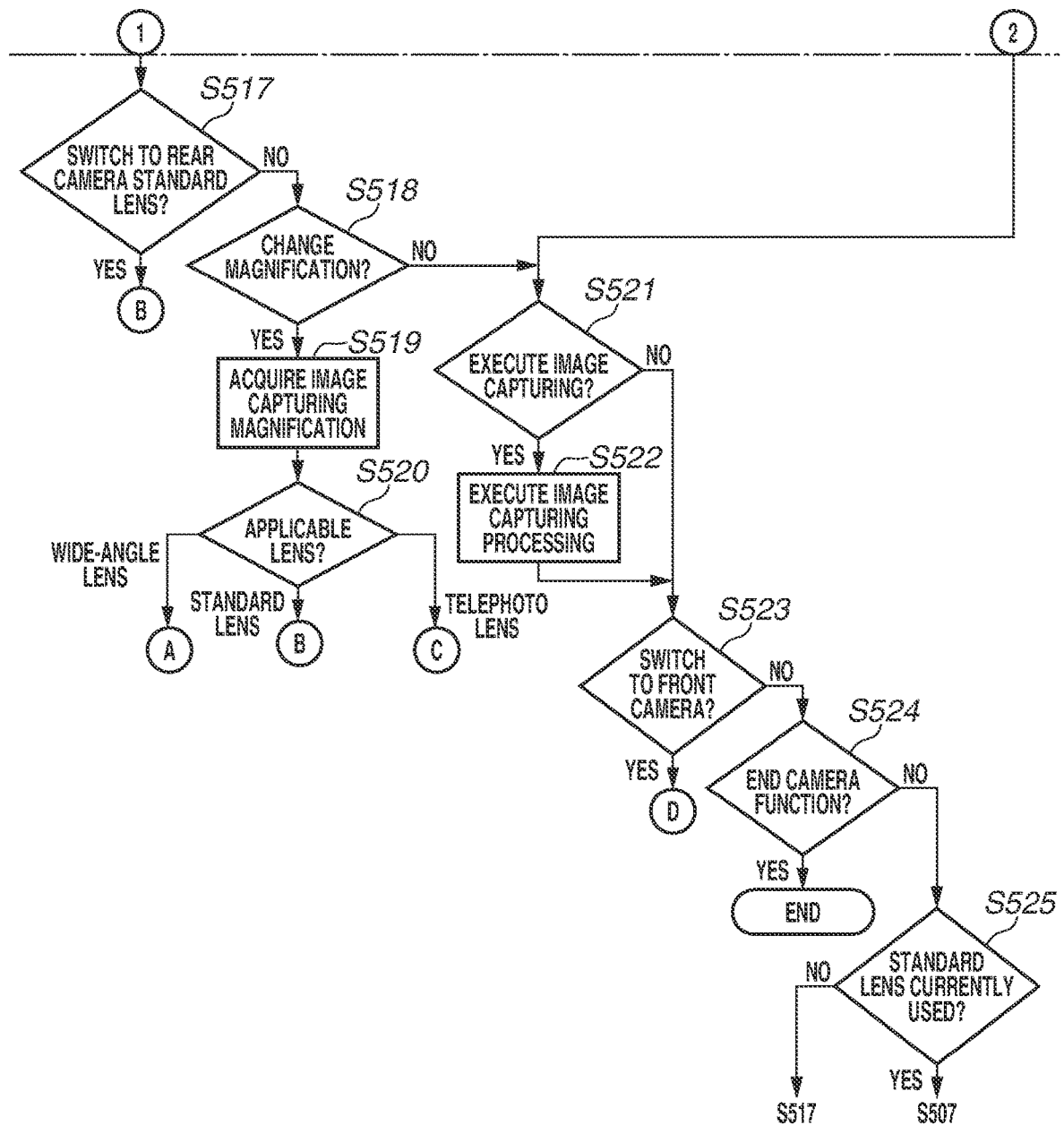
FIG. 5B is a flowchart illustrating image capturing control processing according to the present exemplary embodiment.

FIGS. 4A and 4B illustrate a case where a rear camera on the first surface includes a wide-angle lens, a standard lens, and a telephoto lens, and a front camera on the second surface includes a wide-angle lens and a standard lens.

FIG. 4A illustrates lenses included in each of the lens units corresponding to lens units (rear camera) on the first surface and lens units (front camera) on the second surface. In the lens units on the first surface, a wide-angle lens corresponding to the lens unit 205 has a focal length of 15 mm and an image capturing field angle of 110 degrees. In addition, a standard lens corresponding to the lens unit 204 has a focal length of 20 mm and an image capturing field angle of 80 degrees, and a telephoto lens corresponding to the lens unit 203 has a focal length of 80 mm and an image capturing field angle of 20 degrees. In the lens units on the second surface, a wide-angle lens corresponding to the lens unit 202 has a focal length of 20 mm and an image capturing field angle of 110 degrees, and a standard lens corresponding to the lens unit 201 has a focal length of 30 mm and an image capturing field angle of 70 degrees.

In the lens units on the first surface, an image is captured by the lens unit 205 at an image capturing field angle of 110 degrees, and in a case where a designated image capturing field angle is smaller than 110 degrees and larger than 80 degrees, an image capturing field angle is narrowed using electronic zoom. If an image capturing field angle reaches an image capturing field angle of 80 degrees, image capturing switches to image capturing by a lens of the lens unit 204. Furthermore, an image is captured by the lens unit 204 at an image capturing field angle of 80 degrees, and in a case where a designated image capturing field angle is smaller than 80 degrees and larger than 30 degrees, an image capturing field angle is narrowed using electronic zoom. Nevertheless, a timing at which a lens is switched to a telephoto lens needs not be always a timing at which a designated image capturing field angle becomes 20 degrees. If a designated image capturing field angle reaches 20 degrees, and image capturing switches to image capturing by a lens of the lens unit 203. A designation method of an image capturing field angle will be described below. In this manner, if a field angle change instruction is issued by the user, while using electronic zoom, a lens unit that performs image capturing is switched at a timing at which an instruction to change a field angle to an image capturing field angle at which a neighboring lens unit can perform image capturing is issued. Similarly, also in the case of the second surface, an image is captured by the lens unit 202 at an image capturing field angle of 110 degrees, and if a designated image capturing field angle becomes smaller than 110 degrees and larger than 70 degrees, an image capturing field angle is narrowed using electronic zoom. If a designated image capturing field angle reaches 70 degrees, image capturing switches to image capturing by a lens of the lens unit 201. In the present exemplary embodiment, each lens needs not be a single focus lens, and may have a configuration in which a lens position is movable and optical zoom can be performed.

FIG. 4B is a diagram illustrating switching of a lens unit on the first surface that is performed in a case where a lens unit can perform optical zoom. In the lens units on the first surface, an image is captured by the lens unit 205 at an image capturing field angle of 130 degrees, and if a designated image capturing field angle becomes smaller than 130 degrees, optical zoom is initially performed by moving the position of a lens. Then, if a designated image capturing field angle reaches 110 degrees, an image capturing field angle is narrowed using electronic zoom. If an image capturing field angle reaches an image capturing field angle of 80 degrees, image capturing switches to image capturing by a lens of the lens unit 204. Furthermore, if a designated image capturing field angle becomes smaller than 80 degrees, an image capturing field angle is changed using optical zoom, and if a designated image capturing field angle becomes smaller than 70 degrees, electronic zoom is performed. If a designated image capturing field angle reaches 20 degrees, image capturing is performed using the lens unit 203. If a designated image capturing field angle becomes smaller than 20 degrees, electronic zoom is performed using the lens unit 203. A configuration may be employed in which only single focus lenses are used as lenses of a front camera on the second surface, and lenses of a rear camera on the first surface can perform optical zoom. In addition, both in the case illustrated in FIG. 4A and the case illustrated in FIG. 4B, a timing at which a lens unit that performs image capturing is switched to scale back an image capturing field angle needs not be always consistent with a timing at which a lens unit is switched to scale up an image capturing field angle. A switch timing of a lens unit that performs image capturing may be changed in such a manner as to scale back the influence on a captured image, in accordance with an image capturing mode and an image capturing situation.

Next, image capturing control processing according to the present exemplary embodiment will be described with reference to flowcharts in FIGS. 5A, 5B, 6A and 6B. The processing is implemented by loading a program recorded in the nonvolatile memory 56, onto the system memory 52, and the system control unit 50 executing the program. The processing starts when the power of the smartphone 100 is turned on. The image capturing control processing illustrated in FIGS. 5A, 5B, 6A and 6B is premised on a case where a rear camera on the first surface includes a wide-angle lens, a standard lens, and a telephoto lens, and a front camera on the second surface includes a wide-angle lens and a standard lens. In other words, the description will be given assuming that the lens units illustrated in FIGS. 4A and 4B are arranged on a smartphone, but the configuration is not limited to this.

In step S501, the system control unit 50 determines whether a camera function start-up instruction has been issued. The camera function start-up instruction can be issued by touching an item of a camera that is displayed on the display unit 28. In a case where it is determined that a camera function start-up instruction has been issued (YES in step S501), the processing proceeds to step S502. In a case where it is determined that a camera function start-up instruction has not been issued (NO in step S501), the processing proceeds to step S503.

In step S502, the system control unit 50 starts up the standard lens among lenses of the rear camera on the first surface. That is, the system control unit 50 starts up the camera of the lens unit 204. In other words, if the camera function is started up, the rear camera starts up. As described below, after the rear camera starts up, the rear camera can be switched to a camera on the second surface (i.e., front camera).

In step S503, the system control unit 50 performs other processing. Examples of the other processing include reproduction of images acquired via the lens units 201 to 205, browsing on the Internet, and editing of images.

In step S504, the system control unit 50 sequentially displays, on the display unit 28, captured images acquired via the lens unit 204 (live view image).

Figure 6A:
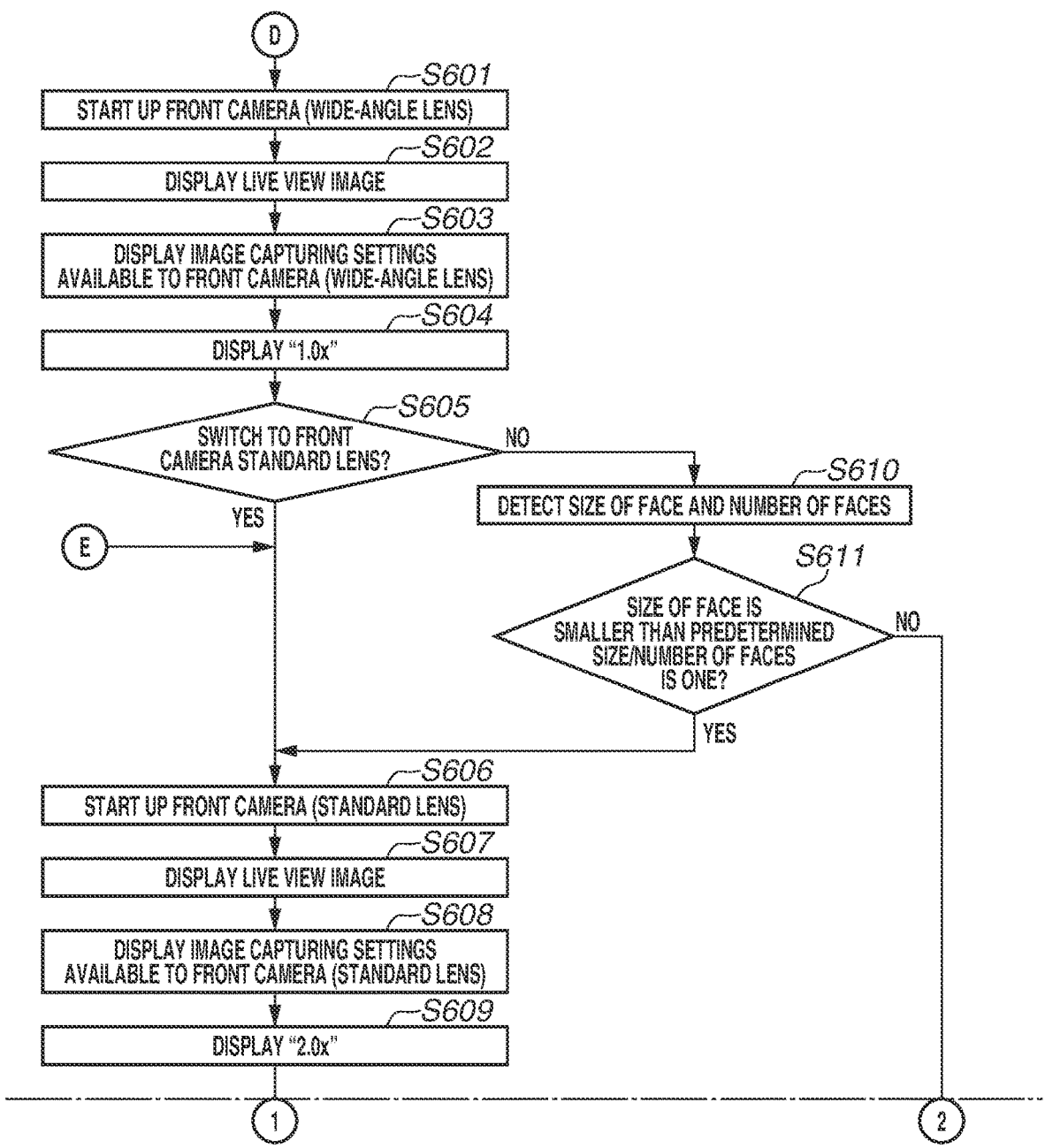
FIG. 6A is a flowchart illustrating image capturing control processing of a front camera according to the present exemplary embodiment.
Figure 6B:
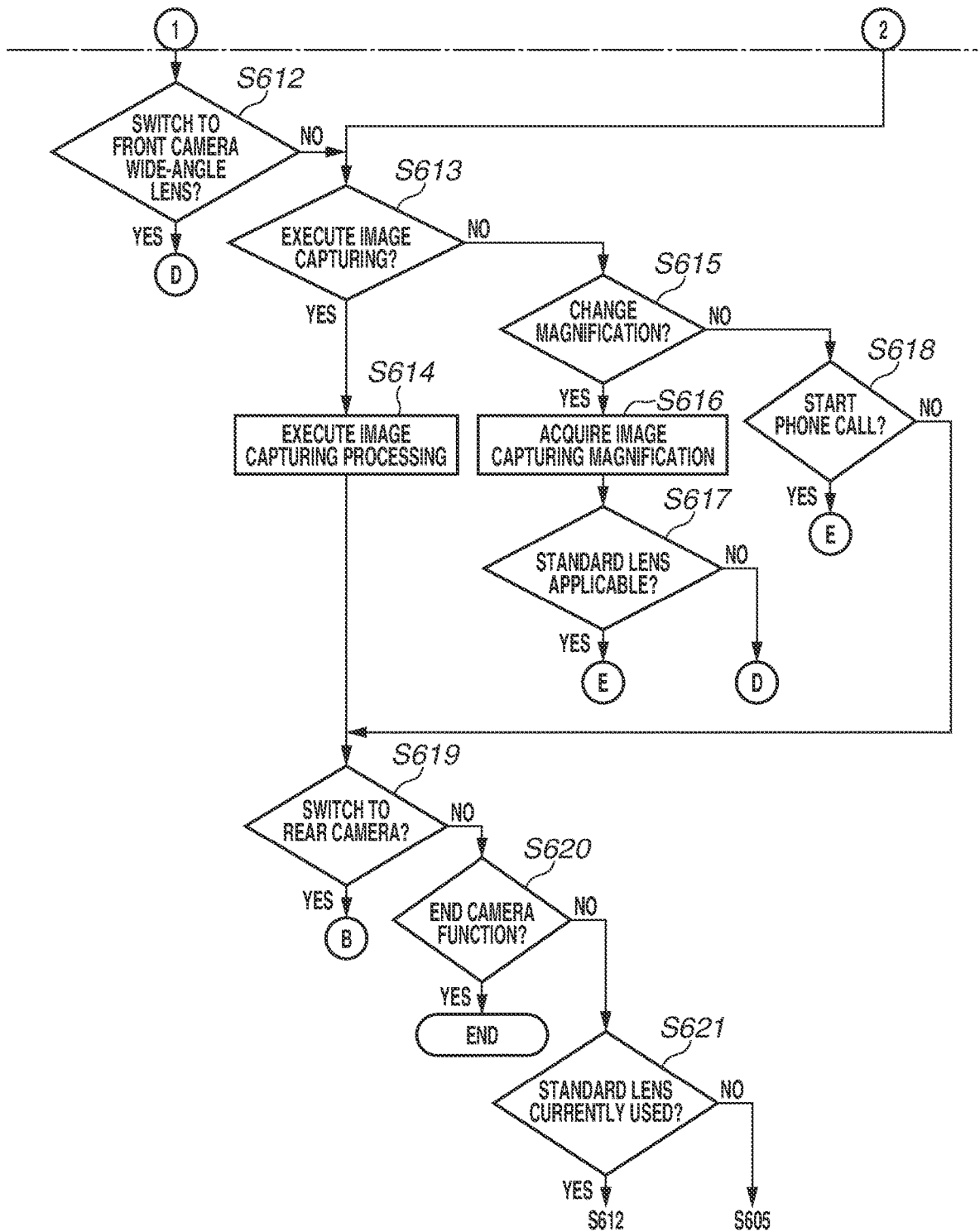
FIG. 6B is a flowchart illustrating image capturing control processing of a front camera according to the present exemplary embodiment.
Figure 7A:
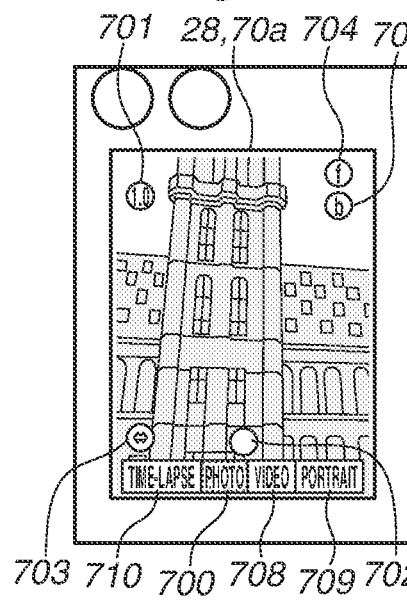
FIG. 7A is a diagram illustrating an example of display in image capturing control processing.

In step S505, the system control unit 50 displays an image capturing setting available to the standard lens (the lens unit 204). FIGS. 7A to 7K each illustrate an example of display in the image capturing control processing illustrated in FIGS. 5A, 5B, 6A and 6B. FIG. 7A illustrates a display example of the display unit 28 to be displayed when the rear camera is started up. An item 704 is an item for changing an aperture value, and an item 705 is an item for changing a beautiful skin effect. When an image including a person is captured by the standard lens of the rear camera, there is a possibility that a face appears big. It is therefore desirable that the beautiful skin effect is provided. In addition, an item 702 illustrated in FIG. 7A is an item for issuing an image capturing instruction, and an item 703 is an item for switching to image capturing by the front camera. Items 700 and 708 to 710 are items for switching an image capturing mode. When the camera starts up, a photo mode indicated by the item 700 is selected, but the camera can start up in a state in which an image capturing mode set when the user starts up the camera lastly is selected. The item 708 indicates a video mode, and it becomes possible to capture a movie. The item 709 indicates a portrait mode, and it becomes possible to capture an image in a state in which a subject on the background of a main subject is blurred. The item 710 indicates a time-lapse mode. In the time-lapse mode, images are consecutively reproduced by performing image capturing every predetermined time, such as two seconds or five seconds.

In step S506, the system control unit 50 displays "1.0× (1×)" on the display unit 28 as an image capturing magnification. As illustrated in FIG. 7A, an item 701 indicates a magnification of current image capturing, and "1.0×" is displayed at the time of start-up. In other words, in a case where an image capturing field angle of image capturing performed using the standard lens illustrated in FIG. 4A is 80 degrees, an image capturing magnification is displayed as 1.0×. In other words, by displaying "1.0×" as a field angle set when electronic zoom is not performed by the standard lens, the user can recognize that a field angle can be changed by scaling back or up the field angle with respect to a currently displayed field angle.

In step S507, the system control unit 50 determines whether an instruction to switch to the wide-angle lens has been issued. In a case where it is determined that an instruction to switch to the wide-angle lens has been issued (YES in step S507), the processing proceeds to step S508. In a case where it is determined that an instruction to switch to the wide-angle lens has not been issued (NO in step S507), the processing proceeds to step S512. In step S512, the system control unit 50 determines whether an instruction to switch to the telephoto lens has been issued. In a case where it is determined in step S512 that an instruction to switch to the telephoto lens has been issued (YES in step S512), the processing proceeds to step S513. In a case where it is determined that an instruction to switch to the telephoto lens has not been issued (NO in step S512), the processing proceeds to step S521. The instruction to switch to the wide-angle lens can be issued by a touch operation on the item 701 displayed on the display unit 28. For example, if a tap operation of touching the item 701 for a short time is performed once, the wide-angle lens of the lens unit 205 is started up, and if a tap operation is further performed once again, the telephoto lens of the lens unit 203 is started up.

In step S508, the system control unit 50 starts up the wide-angle lens among lenses of the rear camera on the first surface. That is, the system control unit 50 starts up the camera of the lens unit 205.

In step S509, the system control unit 50 sequentially displays, on the display unit 28, captured images acquired via the lens unit 205 (live view image).

Figure 7B:
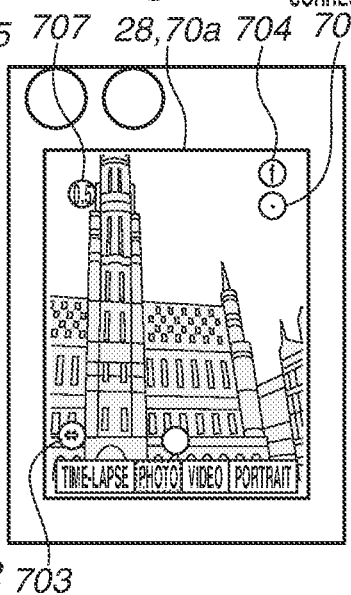
FIG. 7B is a diagram illustrating an example of display in image capturing control processing.

In step S510, the system control unit 50 displays an image capturing setting available to the wide-angle lens (the lens unit 205). FIG. 7B illustrates a display example of the display unit 28 to be displayed when the wide-angle lens is started up among lenses of the rear camera. The item 704 is an item for changing an aperture value, and an item 706 is an item for executing processing of correcting distortion. Distortion sometimes becomes noticeable in an image captured by a wide-angle lens of a rear camera. Thus, by executing image processing of correcting distortion, distortion can be made less noticeable. Aside from these items, the same items as those illustrated in FIG. 7A are also displayed.

In step S511, the system control unit 50 displays "0.5×" on the display unit 28 as an image capturing magnification. As illustrated in FIG. 7B, an item 707 indicates a magnification of current image capturing, and it can be seen that a display magnification is smaller than that of the standard lens (i.e., an image capturing field angle has become wider). In other words, in a case where an image capturing field angle of image capturing performed using the wide-angle lens illustrated in FIG. 4A is 110 degrees, an image capturing magnification is displayed as 0.5× (smaller than 1×). In other words, by displaying "0.5×" as a field angle set when electronic zoom is not performed by the wide-angle lens, the user can recognize that a currently-displayed field angle has become larger than that of the standard lens.

In step S513, the system control unit 50 starts up the telephoto lens among lenses of the rear camera on the first surface. That is, the system control unit 50 starts up the camera of the lens unit 203.

In step S514, the system control unit 50 sequentially displays, on the display unit 28, captured images acquired via the lens unit 203 (live view image).

Figure 7C:
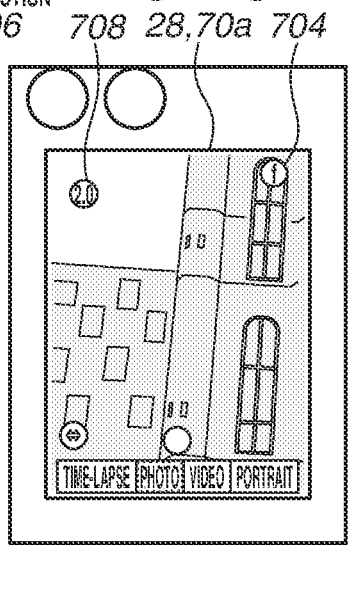
FIG. 7C is a diagram illustrating an example of display in image capturing control processing.

In step S515, the system control unit 50 displays an image capturing setting available to the telephoto lens (the lens unit 203). FIG. 7C illustrates a display example of the display unit 28 to be displayed when the telephoto lens is started up among lenses of the rear camera. The item 704 is an item for changing an aperture value. In image capturing executed by the telephoto lens of the rear camera, the items 705 and 706 displayed when other image capturing magnifications are used are not displayed. Aside from these items, the same items as those illustrated in FIG. 7A are also displayed.

In step S516, the system control unit 50 displays "2.0×" on the display unit 28 as an image capturing magnification. As illustrated in FIG. 7C, an item 708 indicates a magnification of current image capturing, and it can be seen that a display magnification is larger than that of the standard lens (i.e., an image capturing field angle has become narrower). In other words, in a case where an image capturing field angle of image capturing performed using the telephoto lens illustrated in FIG. 4A is 30 degrees, an image capturing magnification is displayed as 2.0×. In other words, by displaying "2.0×" as a field angle set when electronic zoom is not performed by the wide-angle lens, the user can recognize that a currently displayed field angle has become smaller than that of the standard lens.

In the image capturing performed using the rear camera, a person is often regarded as a subject or a landscape image is often captured, using the standard lens or the wide-angle lens. In addition, an image of a distant subject is captured using the telephoto lens. In addition, three lenses, which are larger in number than the number of lenses of the front camera on the second surface, are provided, and a field angle range in which image capturing can be performed is also large. Thus, when "1.0×" is displayed, it can be recognized that a reference image capturing magnification (i.e., a lens other than a lens on the wide-angle side or the telephoto side) is used, and it can be recognized that there is a lens that can perform image capturing at a field angle wider or more telephoto than the currently used lens. In other words, if "1.0×" is displayed as an image capturing magnification in a state in which three or more lenses are provided, it becomes easier for the user to recognize that a magnification can be changed to a magnification smaller than 1.0× or larger than 1.0×.

In step S517, the system control unit 50 determines whether an instruction to switch to the standard lens has been issued. Switching from the wide-angle lens to the standard lens can be performed by a touch operation on the item 708. By touch operations on the items 701, 707, and 708, image capturing magnifications are selected in order in a toggle manner. In other words, image capturing magnifications are toggled in the order of 1.0×, 0.5×, and 2.0×, but the order is not limited to this order. The items 701, 707, and 708 can be always displayed together with a live view image, and the user may be enabled to select any of these. In a case where it is determined that an instruction to switch to the standard lens has been issued (YES in step S517), the processing proceeds to step S502. In a case where it is determined that an instruction to switch to the standard lens has not been issued (NO in step S517), the processing proceeds to step S518.

Figure 7D:
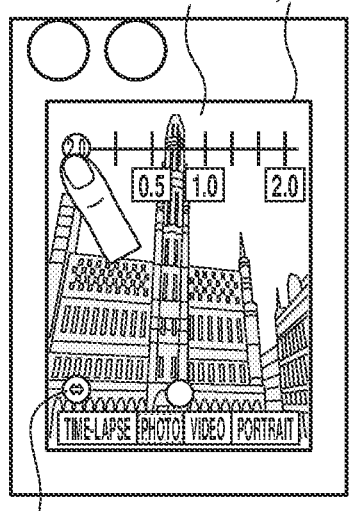
FIG. 7D is a diagram illustrating an example of display in image capturing control processing.

In step S518, the system control unit 50 determines whether a change operation of an image capturing magnification has been performed. As to a change of an image capturing magnification, after a long-pressing operation of the item 701, an item 711 illustrated in FIG. 7D is displayed, and an image capturing magnification can be changed by a touch move on a bar of the item 711. The item 711 indicates settable image capturing magnifications. By moving a touch position, the user can set an image capturing magnification while viewing a live view screen. The item 711 is hidden when the user releases the touch. In a case where it is determined that a change operation of an image capturing magnification has been performed (YES in step S518), the processing proceeds to step S519. In a case where it is determined that a change operation of an image capturing magnification has not been performed (NO in step S518), the processing proceeds to step S521.

In step S519, the system control unit 50 acquires an image capturing magnification designated by a touch operation on the item 711. In step S520, the system control unit 50 determines a lens corresponding to the acquired image capturing magnification, from among the telephoto lens, the standard lens, and the wide-angle lens. For example, if a magnification larger than 1.0× and smaller than 2.0× is designated by a touch operation on the item 711, the standard lens is selected. If a magnification smaller than 1.0× is selected, the wide-angle lens is selected, and if a magnification equal to or larger than 2.0× is selected, the telephoto lens is selected. In a case where it is determined that the standard lens is selected, the processing proceeds to step S502. In a case where it is determined that the wide-angle lens is selected, the processing proceeds to step S508. In a case where it is determined that the telephoto lens is selected, the processing proceeds to step S513.

In step S521, the system control unit 50 determines whether an image capturing instruction has been issued. The image capturing instruction can be issued by a touch operation on the item 702. In a case where it is determined that an image capturing instruction has been issued (YES in step S521), the processing proceeds to step S522. In a case where it is determined that an image capturing instruction has not been issued (NO in step S521), the processing proceeds to step S523.

In step S522, the system control unit 50 performs image capturing processing. The system control unit 50 records a captured image onto the recording medium 200.

In step S523, the system control unit 50 determines whether an instruction to switch to the front camera has been issued. That is, the system control unit 50 determines whether an instruction to switch to the camera on the second surface has been issued. The instruction to switch to the front camera can be issued by a touch operation on the item 703. In a case where it is determined that an instruction to switch to the front camera has been issued (YES in step S523), the processing proceeds to image capturing control processing of the front camera that is illustrated in FIG. 6A. In a case where it is determined that an instruction to switch to the front camera has not been issued (NO in step S523), the processing proceeds to step S524.

In step S524, the system control unit 50 determines whether to end the camera function. An instruction to end the camera function can be issued by pressing the power switch 72, an operation of scrolling the display unit 28 upward, or a pinch operation of pinching a live view image. In a case where it is determined that an instruction to end the camera function has been has been issued (YES in step S524), the processing illustrated in FIGS. 5A and 5B ends. In a case where it is determined that an instruction to end the camera function has not been issued (NO in step S524), the processing proceeds to step S525.

In step S525, the system control unit 50 determines whether a currently used lens is the standard lens. In a case where a currently used lens is the standard lens (YES in step S525), the processing proceeds to step S507. In a case where a currently used lens is not the standard lens (NO in step S525), the processing proceeds to step S517.

Next, image capturing control processing of the front camera according to the present exemplary embodiment will be described with reference to FIGS. 6A and 6B. The processing is started if it is determined in step S523 of FIG. 5B that an instruction to switch to the front camera has been issued (YES in step S523).

In step S601, the system control unit 50 starts up the wide-angle lens among lenses of the front camera on the second surface. That is, the system control unit 50 starts up the camera of the lens unit 202. In other words, if an instruction to start up the front camera is issued, a camera on the wide-angle side is initially started up. In a case where an instruction to start up the front camera is issued in this manner, the user who desires to perform image capturing on the wide-angle side needs not to perform an operation of changing a field angle from a field angle of the standard lens to a field angle on the wide-angle side, by starting up a lens on the wide-angle side. The front camera starts up at a wide-angle end, the user can thus recognize a limit at which a field angle cannot be made any wider by an optical requirement. The user can recognize a wide-angle end (i.e., the largest field angle at which image capturing can be performed) when the front camera starts up, the user can therefore easily consider a range in which image capturing can be performed, and consider whether to narrow an image capturing range.

In step S602, the system control unit 50 sequentially displays, on the display unit 28, captured images acquired via the lens unit 201 (live view image).

Figure 7E:
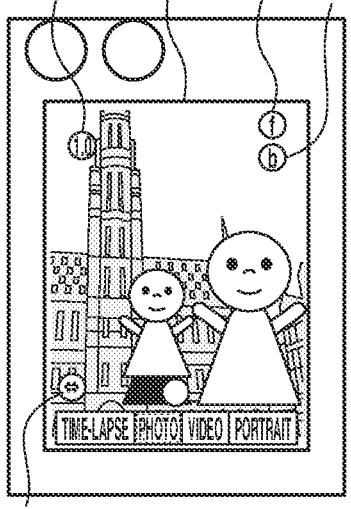
FIG. 7E is a diagram illustrating an example of display in image capturing control processing.

In step S603, the system control unit 50 displays an image capturing setting available to the wide-angle lens (the lens unit 202). FIG. 7E illustrates a display example of the display unit 28 to be displayed when the front camera is started up. The item 704 is an item for changing an aperture value, and the item 705 is an item for changing a beautiful skin effect. When an image including a person is captured by the wide-angle lens of the front camera, there is a possibility that a face appears big. It is therefore desirable that the beautiful skin effect is provided. When the front camera starts up, the photo mode indicated by the item 700 is selected, but the camera may start up in a state in which an image capturing mode set when the user starts up the camera lastly is selected.

In step S604, the system control unit 50 displays "1.0×" on the display unit 28 as an image capturing magnification. As illustrated in FIG. 7E, an item 712 indicates a magnification of current image capturing, and "1.0×" is displayed at the time of start-up. In other words, in a case where an image capturing field angle of image capturing performed using the wide-angle lens illustrated in FIG. 4B is 110 degrees, an image capturing magnification is displayed as 1.0×. In other words, the user can recognize that a field angle becomes further larger if the field angle is changed with respect to a currently displayed field angle, by displaying "1.0×" as a field angle set when electronic zoom is not performed by the wide-angle lens.

In step S605, the system control unit 50 determines whether an instruction to switch to the standard lens has been issued. In a case where it is determined that an instruction to switch to the standard lens has been issued (YES in step S605), the processing proceeds to step S607. In a case where it is determined that an instruction to switch to the standard lens has not been issued (NO in step S605), the processing proceeds to step S610. The instruction to switch to the standard lens can be issued by a touch operation on the item 712 displayed on the display unit 28. For example, if a tap operation of touching the item 712 for a short time is performed once, the standard lens of the lens unit 201 is started up.

In step S606, the system control unit 50 starts up the standard lens among lenses of the front camera on the second surface. That is, the system control unit 50 starts up the camera of the lens unit 201.

In step S607, the system control unit 50 sequentially displays, on the display unit 28, captured images acquired via the lens unit 201 (live view image).

Figure 7F:
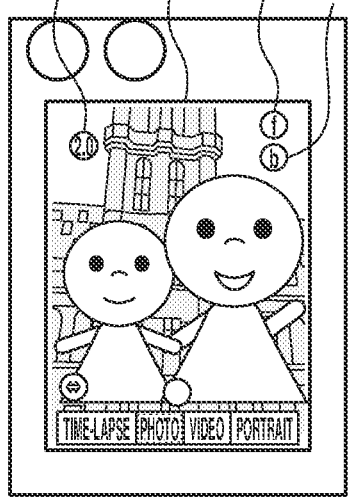
FIG. 7F is a diagram illustrating an example of display in image capturing control processing.

In step S608, the system control unit 50 displays an image capturing setting available to the standard lens (the lens unit 201). FIG. 7F illustrates a display example of the display unit 28 to be displayed when the front camera is started up among lenses of the front camera. The item 704 is an item for changing an aperture value, and the item 705 is an item for changing a beautiful skin effect. Aside from these items, the same items as those illustrated in FIG. 7A are also displayed.

In step S609, the system control unit 50 displays "2.0×" on the display unit 28 as an image capturing magnification. As illustrated in FIG. 7F, an item 713 indicates a magnification of current image capturing, and it can be seen that a display magnification has become larger than 1.0× (i.e., an image capturing field angle has become narrower). In other words, in a case where an image capturing field angle of image capturing performed using the standard lens illustrated in FIG. 4A is 70 degrees, an image capturing magnification is displayed as 2.0×. In other words, the user can recognize that a currently displayed field angle can be made larger, by displaying "2.0×" as a field angle set when electronic zoom is not performed by the standard lens. If "1.0×" is displayed as an image capturing magnification even when the standard lens is used, it can be recognized that a current field angle can be changed using electronic zoom to a field angle corresponding to a magnification larger than 1.0×, and the field angle can be narrowed, but it is difficult to intuitively recognize whether the field angle can be made larger than the current field angle. In other words, in a case where "1.0×" is displayed as an image capturing magnification, it can be seen that a field angle can be narrowed using electronic zoom, but it is difficult to recognize whether there is a lens that can perform image capturing at a field angle wider than that of a currently used lens. Nevertheless, when the standard lens and the wide-angle lens are provided, the user can recognize that a current field angle is a field angle magnified to 2.0× from a certain field angle, if "2.0×" (magnification larger than 1.0×) is displayed when the standard lens is used. Then, the user can recognize that the current field angle can be changed to an unmagnified field angle. That is, the user can recognize that image capturing at a wider field angle can be performed. On the other hand, when the standard lens and the wide-angle lens are provided, the user can at least recognize that an image capturing magnification can be changed using electronic zoom to an image capturing magnification larger than 1.0×, if "1.0×" is displayed when the wide-angle lens is used. The user can therefore recognize that a current image capturing field angle is a wider field angle within a changeable field angle range, and image capturing can be performed at the image capturing field angle.

In step S610, the system control unit 50 detects, from a live view image, a size of a face in an image being captured, and the number of faces.

In step S611, the system control unit 50 determines whether the total area (size) of faces acquired in step S610 is smaller than a predetermined size, or whether the number of faces is one, or whether none of these conditions is satisfied. In a case where it is determined that either of the conditions is satisfied (YES in step S611), the processing proceeds to step S606. In a case where it is determined that none of the conditions is satisfied (NO in step S611), the processing proceeds to step S613. If an area of a region in the entire live view image that includes a face is smaller than a predetermined size (area), such as ⅕ or ⅛ of the entire live view image, there is a high possibility that a camera and a subject are separated enough from each other even if image capturing is not performed using the wide-angle lens. Thus, in this case, if image capturing is performed using a standard lens, an image in which the face of the user is in a large size can be captured. On the other hand, if the face of the user is not separated enough, if image capturing is performed using the standard lens, adjusting a field angle in such a manner as not to include a hand holding the smartphone accordingly makes it difficult to perform image capturing from a position sufficiently higher than the face. Consequently, a captured image in which the face of the user appears big is sometimes obtained. If a distance between a camera and a subject is large enough, the user is highly likely to perform image capturing using the standard lens. If the distance is not large enough, the user is highly likely to perform image capturing using the wide-angle lens. By determining the size of a face as in step S611, and automatically performing image capturing using the standard lens if the area of the face is small, a possibility that image capturing can be performed at an appropriate field angle without the user switching a lens becomes high.

In a case where the number of faces is one, a subject becomes relatively small with respect to a live view image, even if image capturing is performed using the standard lens, there is a low possibility that the face appears big, and therefore automatically switching to the standard lens reduces the operation of the user.

In step S612, the system control unit 50 determines whether an instruction to switch to the wide-angle lens has been issued. In a case where it is determined that an instruction to switch to the wide-angle lens has been issued (YES in step S612), the processing proceeds to step S601. In a case where it is determined that an instruction to switch to the wide-angle lens has not been issued (NO in step S612), the processing proceeds to step S613. The instruction to switch to the wide-angle lens can be issued by a touch operation on the item 713 displayed on the display unit 28. For example, if a tap operation of touching the item 713 is performed once for a short time, the wide-angle lens of the lens unit 202 is started up.

In step S613, the system control unit 50 determines whether an image capturing instruction has been issued. The image capturing instruction can be issued by a touch operation on the item 702. In a case where it is determined that an image capturing instruction has been issued (YES in step S613), the processing proceeds to step S614. In a case where it is determined that an image capturing instruction has not been issued (NO in step S613), the processing proceeds to step S615.

In step S614, the system control unit 50 performs image capturing processing. The system control unit 50 records a captured image on the recording medium 200.

In step S615, the system control unit 50 determines whether a change operation of an image capturing magnification has been performed. As to a change of an image capturing magnification, after a long-pressing operation of the item 712, an item for changing an image capturing magnification, like the item 711 illustrated in FIG. 7D, is displayed, and an image capturing magnification can be changed by a touch move on a bar of the item. In a case where it is determined that a change operation of an image capturing magnification has been performed (YES in step S615), the processing proceeds to step S616. In a case where it is determined that a change operation of an image capturing magnification has not been performed (NO in step S615), the processing proceeds to step S618.

In step S616, the system control unit 50 acquires an image capturing magnification designated by a touch operation on the item displayed in step S615. In step S617, the system control unit 50 determines whether a lens corresponding to the acquired image capturing magnification is the standard lens or the wide-angle lens. For example, if a large magnification equal to or larger than 2.0× is designated by a touch operation on the item displayed in step S615, the standard lens is selected. If a magnification smaller than 2.0× is selected, the wide-angle lens is selected. In a case where it is determined that the standard lens is selected, the processing proceeds to step S606. In a case where it is determined that the wide-angle lens is selected, the processing proceeds to step S601.

In step S618, the system control unit 50 determines whether a start-up instruction of a phone call function has been issued using the smartphone 100. The start-up instruction of the phone call function may be made executable when the camera function is being started up, or may be made executable even if the camera function has not been started up. In a case where it is determined that a start-up instruction of the phone call function has been issued (YES in step S618), the processing proceeds to step S606. In a case where it is determined that a start-up instruction of the phone call function has not been issued (NO in step S618), the processing proceeds to step S619.

In step S619, the system control unit 50 determines whether an instruction to switch to the rear camera has been issued. That is, the system control unit 50 determines whether an instruction to switch to the camera on the first surface has been issued. The instruction to switch to the rear camera can be issued by a touch operation on the item 703. In a case where it is determined that an instruction to switch to the rear camera has been issued (YES in step S619), the processing proceeds to step S502 of FIG. 5A. In a case where it is determined that an instruction to switch to the rear camera has not been issued (NO in step S619), the processing proceeds to step S620.

In step S620, the system control unit 50 determines whether to end the camera function. An instruction to end the camera function can be issued by pressing the power switch 72, an operation of scrolling the display unit 28 upward, or a pinch operation of pinching a live view image. In a case where it is determined that an instruction to end the camera function has been has been issued, the processing illustrated in FIGS. 6A and 6B ends. In a case where it is determined that an instruction to end the camera function has not been issued, the processing proceeds to step S621.

In step S621, the system control unit 50 determines whether a currently used lens is the standard lens. In a case where the currently used lens is the standard lens, the processing proceeds to step S612. In a case where a currently used lens is not the standard lens, the processing proceeds to step S605.

Figure 7G:
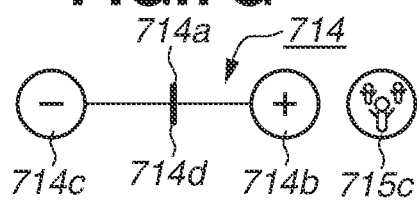
FIG. 7G is a diagram illustrating an example of display in image capturing control processing.
Figure 7H:
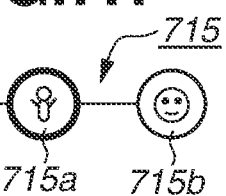
FIG. 7H is a diagram illustrating an example of display in image capturing control processing.
Figure 7I:
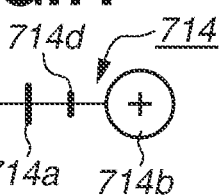
FIG. 7I is a diagram illustrating an example of display in image capturing control processing.
Figure 7J:
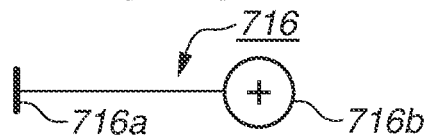
FIG. 7J is a diagram illustrating an example of display in image capturing control processing.
Figure 7K:
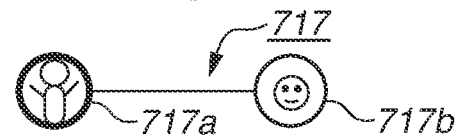
FIG. 7K is a diagram illustrating an example of display in image capturing control processing.

In the above-described exemplary embodiment, the description has been given of an example in which an item for changing an image capturing magnification is indicated by a number, but the present exemplary embodiment is not limited to this. The display to be described below may be employed. FIGS. 7G to 7K each illustrate an example of an item for changing an image capturing magnification. In the above-described exemplary embodiment, the description has been given of an example in which the item 711 for changing an image capturing magnification is displayed if the item 701 or the 712 is long-pressed. However, the item may be always displayed together with a live view image even if a display instruction is not issued from the user. FIG. 7G illustrates an item 714 for changing an image capturing magnification to be displayed when the rear camera is started up. A line 714a in the item 714 indicates a midmost position between a wide-angle end 714c and a telephoto end 714b. A designation item 714d overlapping the line 714a is movable, and an image capturing magnification can be changed by moving the designation item 714d. An actual central field angle of a range from a field angle set when the wide-angle end 714c is actually selected, to a field angle set when the telephoto end 714b is actually selected needs not correspond to an image capturing magnification of 1.0×. FIG. 7H illustrates an item 715 for changing an image capturing magnification that is to be displayed when the rear camera is started up. An item 715a in the item 715 indicates that the standard lens is started up. The item 715a is surrounded by a bold frame, and indicates that image capturing is currently performed using the standard lens at a field angle set without using electronic zoom. By moving a touch position on the item 715, an image capturing magnification can be changed. If an item 715b is selected, the telephoto lens starts up, and if an item 715c is selected, the wide-angle lens starts up. If a position on a bar between items is selected, an image capturing magnification can be changed to an image capturing magnification set using electronic zoom. FIG. 7I illustrates a display mode of the item 714 displayed when an image capturing magnification of the rear camera is changed toward the telephoto side. By moving the designation item 714d toward the telephoto side, an image capturing magnification can be changed. FIG. 7J illustrates an item 716 for changing an image capturing magnification that is to be displayed when the front camera is started up. A designation item 716a is an item for changing an image capturing magnification. By changing a touch position on the item 716, an image capturing magnification can be changed. In addition, an item 716b indicates a telephoto end, and if the designation item 716a is moved up to the item 716b, an image capturing magnification can be made large. Because the designation item 716a exists at the end on the wide-angle side when the front camera is started up, the user can recognize that a current live view image is captured at a widest angle. FIG. 7K illustrates an item 717 for changing an image capturing magnification that is to be displayed when the front camera is started up. An item 717a corresponds to an image capturing magnification set when the wide-angle lens is started up, and an item 717b corresponds to an image capturing magnification set when the standard lens is started up. By touching a position on the item 717, an image capturing magnification can be changed. Because the item 717a is selected when the front camera is started up, the user can recognize that a current image capturing magnification is on the wide-angle side.

According to the above-described exemplary embodiment, the user can perform image capturing at a wide field angle without increasing the number of operation steps, when performing image capturing using the front camera.

The description has been given of an example in which a lens is switched to the standard lens if a phone call starts in step S618. Also in the following case, a lens may be switched to the standard lens when the front camera starts up. For example, a scene on the background of a person is determined from a captured image, and in a case where the background is a light-colored wall or a background in a room the user is highly likely to desire to capture an image in which a size of a person is large, and thus a lens is switched to the standard lens. In contrast, in a case where it is determined that a building or a landscape exists the user is highly likely to desire to capture an image including the landscape or the building, and thus the wide-angle lens is started up.

Next, image capturing mode selection processing according to the present exemplary embodiment will be described with reference to flowcharts in FIGS. 8A, 8B, 8C and 9. The processing is implemented by loading a program recorded on the nonvolatile memory 56, onto the system memory 52, and the system control unit 50 executing the program. The processing starts when the power of the smartphone 100 is turned on. The image capturing mode selection processing illustrated in FIGS. 8A, 8B, 8C and 9 is premised on a case where a rear camera on the first surface includes a super-wide-angle lens, a wide-angle lens, and a standard lens, and a front camera on the second surface includes a wide-angle lens and a standard lens. In other words, the description will be given assuming that the lens units illustrated in FIGS. 3A and 3B are arranged on a smartphone, but the configuration is not limited to this. In the image capturing control processing described with reference to FIGS. 5A, 5B, 6A and 6B, a change of an image capturing magnification in the camera function has been described. In the following flowchart, a change of an image capturing mode in the camera function will be described together with the control of a change of an image capturing magnification. The exemplary embodiment described with reference to FIGS. 5A, 5B, 6A and 6B, and the exemplary embodiment to be described with reference to FIGS. 8A, 8B, 8C and 9 may be executed in combination.

In step S801, the system control unit 50 determines whether a camera function start-up instruction has been issued. The camera function start-up instruction can be issued by touching an item of a camera that is displayed on the display unit 28. In a case where it is determined that a camera function start-up instruction has been issued (YES in step S801), the processing proceeds to step S802. In a case where it is determined that a camera function start-up instruction has not been issued (NO in step S801), the processing proceeds to step S803.

In step S802, the system control unit 50 starts up the standard lens among lenses of the rear camera on the first surface. That is, the system control unit 50 starts up the camera of the lens unit 203. In other words, if the camera function is started up, the rear camera starts up. As described below, the rear camera can be switched to a camera on the second surface (i.e., front camera) after the rear camera starts up.

In step S803, the system control unit 50 performs other processing. Examples of the other processing include reproduction of images acquired via the lens units 201 to 205, browsing on the Internet, and editing of images.

In step S804, the system control unit 50 sequentially displays, on the display unit 28, captured images acquired via the lens unit 203 (live view image).

Figure 9:
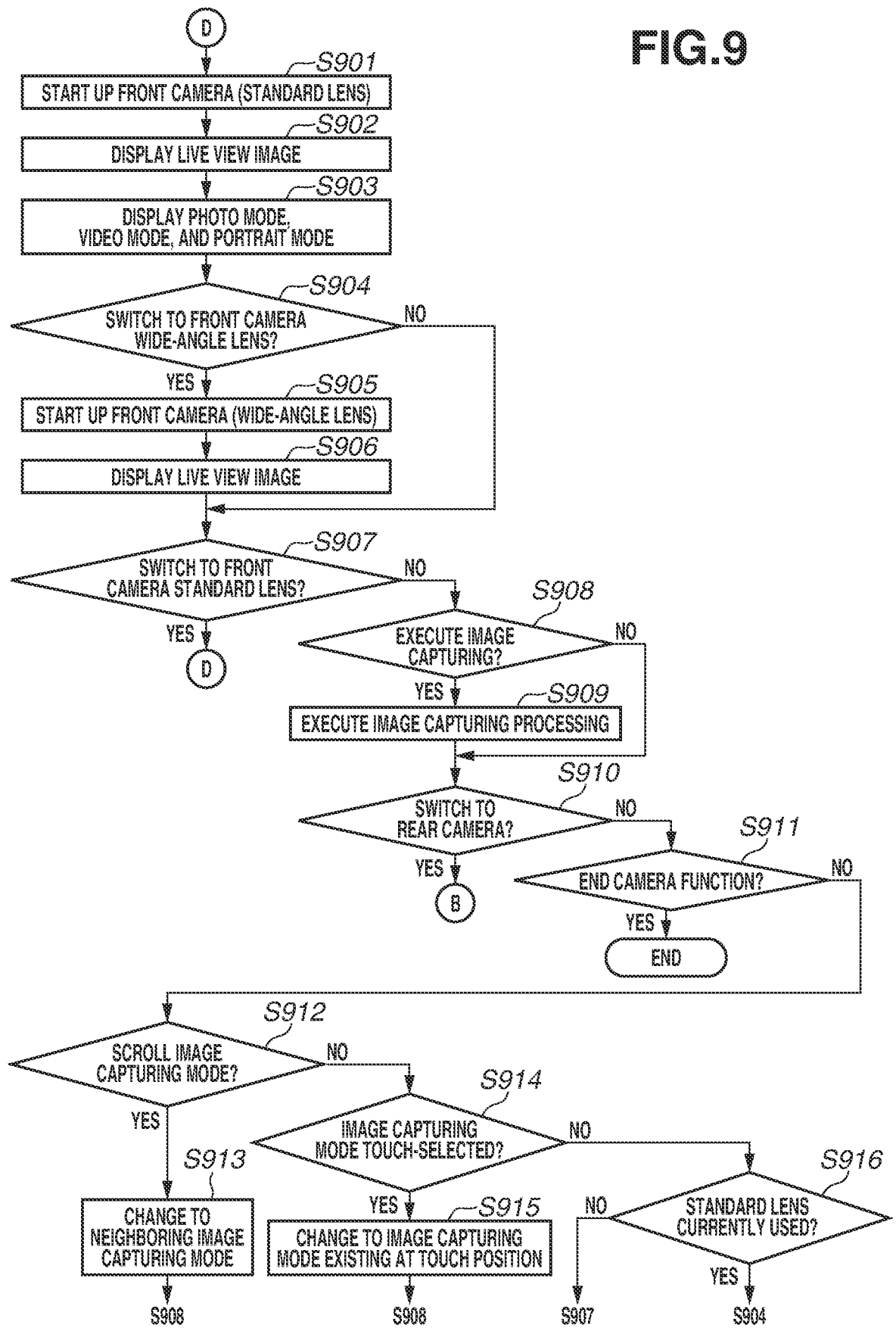
FIG. 9 is a flowchart illustrating image capturing mode selection processing of a front camera according to the present exemplary embodiment.
Figure 10A:
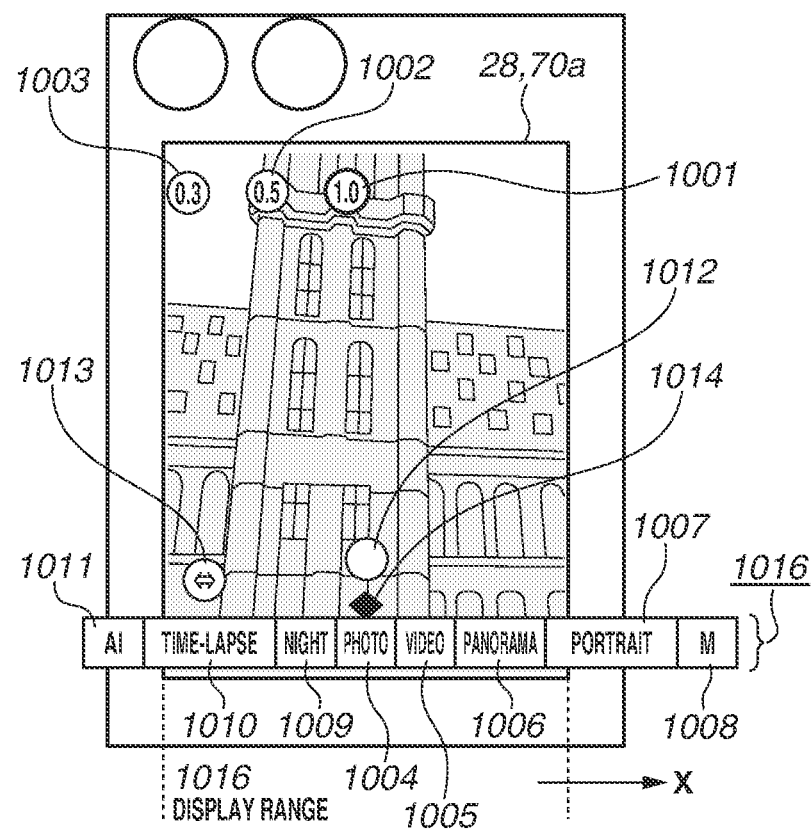
FIG. 10A is a diagram illustrating an example of display in image capturing mode selection processing.

In step S805, the system control unit 50 displays candidates of selectable image capturing modes on the display unit 28. Candidates of image capturing modes include a photo mode, a night mode, an automatic determination mode, a portrait mode, a panorama mode, a video mode, a time-lapse mode, and a manual mode. FIGS. 10A to 10E and 11A to 11D each illustrate an example of display to be described with reference to the flowcharts in FIGS. 8A, 8B, 8C and 9. FIG. 10A illustrates an example of an image capturing screen to be displayed on the display unit 28 when the rear camera is started up. An item group 1016 includes items 1004 to 1011 corresponding to image capturing modes, and a part of the items are displayed on the display unit 28. In FIG. 10A, the items 1004 to 1006, and 1009, and a part of the items 1007 and 1010 are displayed. The item 1004 indicates the photo mode, the item 1005 indicates the video mode, the item 1006 indicates the panorama mode, the item 1007 indicates the portrait mode, the item 1008 indicates the manual mode (M mode), and the item 1009 indicates the night mode. Furthermore, the item 1010 indicates the time-lapse mode and the item 1011 indicates the automatic determination mode (AI mode). In FIGS. 10A to 10D, and 11B, items corresponding to the image capturing mode not actually displayed are also displayed for the sake of explanatory convenience. When the camera function starts up, the photo mode is selected as an image capturing mode, and the corresponding item 1004 is displayed in a state of being in contact with a mark 1014 indicating that the item is selected. An image capturing mode corresponding to an item displayed immediately below the mark 1014 is a currently selected image capturing mode. The mark 1014 is displayed at the center in a short direction of the display unit 28, and even if a selected image capturing mode is changed, the position remains unchanged. Thus, if a selected image capturing mode is changed by scrolling the item group 1016, among the image capturing modes included in the item group 1016, image capturing modes displayed on the display unit 28 change. An item 1001 indicates 1.0× as a current image capturing magnification, and is surrounded by a line thicker than those surrounding an item 1002 (0.5×) and an item 1003 (0.3×) that indicate other image capturing magnifications. By changing a display mode in this manner, the user can recognize a currently selected image capturing magnification. If an item 1013 is selected, a lens can be switched to a lens of the front camera arranged on the second surface. An item 1012 is an item for issuing an image capturing instruction.

In step S806, the system control unit 50 determines whether an instruction to switch to the wide-angle lens has been issued. In a case where it is determined that an instruction to switch to the wide-angle lens has been issued, the processing proceeds to step S807. In a case where it is determined that an instruction to switch to the wide-angle lens has not been issued, the processing proceeds to step S811. In step S811, the system control unit 50 determines whether an instruction to switch to the super-wide-angle lens has been issued. In a case where it is determined in step S811 that an instruction to switch to the super-wide-angle lens has been issued, the processing proceeds to step S812. In a case where it is determined that an instruction to switch to the super-wide-angle lens has not been issued, the processing proceeds to step S816. The instruction to switch to the wide-angle lens can be issued by a touch operation on the item 1002 displayed on the display unit 28. The instruction to switch to the super-wide-angle lens can be issued by a touch operation on the item 1003 displayed on the display unit 28.

In step S807, the system control unit 50 starts up the wide-angle lens among lenses of the rear camera on the first surface. That is, the system control unit 50 starts up the camera of the lens unit 204.

In step S808, the system control unit 50 sequentially displays, on the display unit 28, captured images acquired via the lens unit 204 (live view image).

In step S809, the system control unit 50 determines whether a current image capturing mode is the photo mode. In a case where it is determined that a current image capturing mode is the photo mode (YES in step S809), the processing proceeds to step S810. In a case where it is determined that a current image capturing mode is not the photo mode (NO in step S809), the processing proceeds to step S824.

Figure 10B:
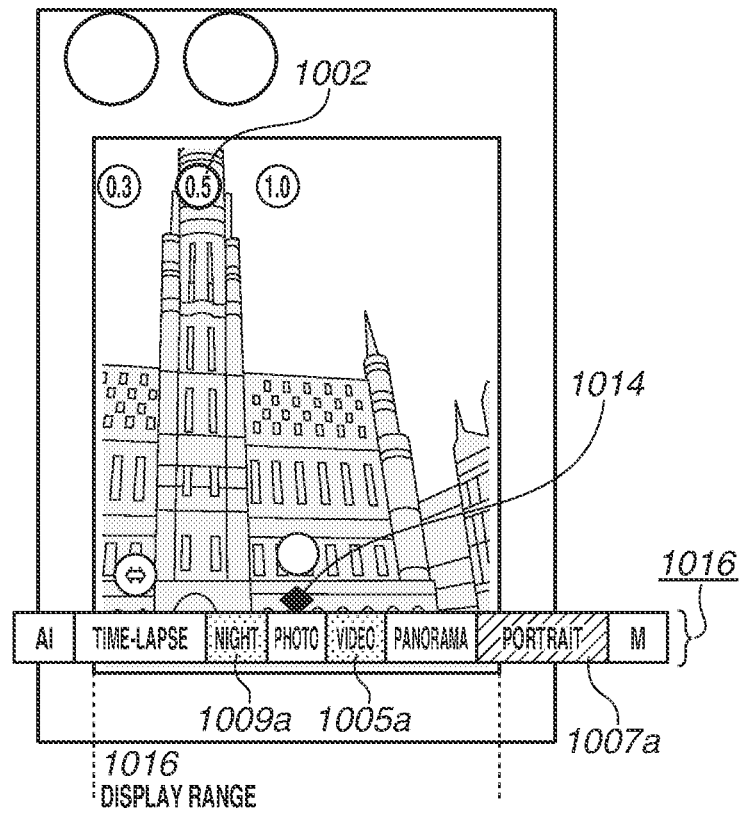
FIG. 10B is a diagram illustrating an example of display in image capturing mode selection processing.

In step S810, the system control unit 50 highlights an image capturing mode suitable for image capturing performed using a wide-angle camera, and displays an unsuitable image capturing mode in a grayout state. FIG. 10B illustrates a display example of the display unit 28 to be displayed in a case where a lens is switched to the wide-angle lens in the photo mode. As illustrated in FIG. 10B, an item 1009a indicating the night mode and an item 1005a indicating the video mode are displayed in such a manner as to be distinguishable from the other items (i.e., 1006, 1010). For example, displaying an item in a distinguishable manner refers to painting the item in eye-catching color, displaying the item in a large size than those of other items, or displaying the item in a state of vibrating slightly. In addition, an item 1007a indicating the portrait mode is displayed in a grayout state. The grayout state indicates that image capturing in the portrait mode is not to be performed when the wide-angle lens is selected. A display mode of the item 1007a needs not be the grayout state, and the item itself may be displayed in faint color or displayed in a small size. The item 1007a may be hidden. In other words, in a case where the wide-angle lens is selected in the photo mode, the user is highly likely to earnestly desire to perform image capturing using the wide-angle lens. Thus, by presenting an image capturing mode suitable for image capturing performed using the wide-angle lens, to the user in an easy-to-understand manner, the user can swiftly switch an image capturing mode. In addition, by displaying, in the grayout state, an image capturing mode that disables image capturing performed using the wide-angle lens, the user can recognize that, if the image capturing mode in the grayout state is selected, image capturing performed using the wide-angle lens becomes inexecutable. If the video mode is selected when the wide-angle lens is used, a time series variation in a wide range can be recorded. If the night mode is selected when the wide-angle lens is used, it is possible to capture an image including a plurality of buildings, or including a large building. The image capturing modes suitable for the wide-angle lens are not limited to the above-described image capturing modes.

In step S812, the system control unit 50 starts up the super-wide-angle lens among lenses of the rear camera on the first surface. That is, the system control unit 50 starts up the camera of the lens unit 205.

In step S813, the system control unit 50 sequentially displays, on the display unit 28, captured images acquired via the lens unit 205 (live view image).

In step S814, the system control unit 50 determines whether a current image capturing mode is the photo mode. In a case where it is determined that a current image capturing mode is the photo mode (YES in step S814), the processing proceeds to step S815. In a case where it is determined that a current image capturing mode is not the photo mode (NO in step S814), the processing proceeds to step S824.

Figure 10C:
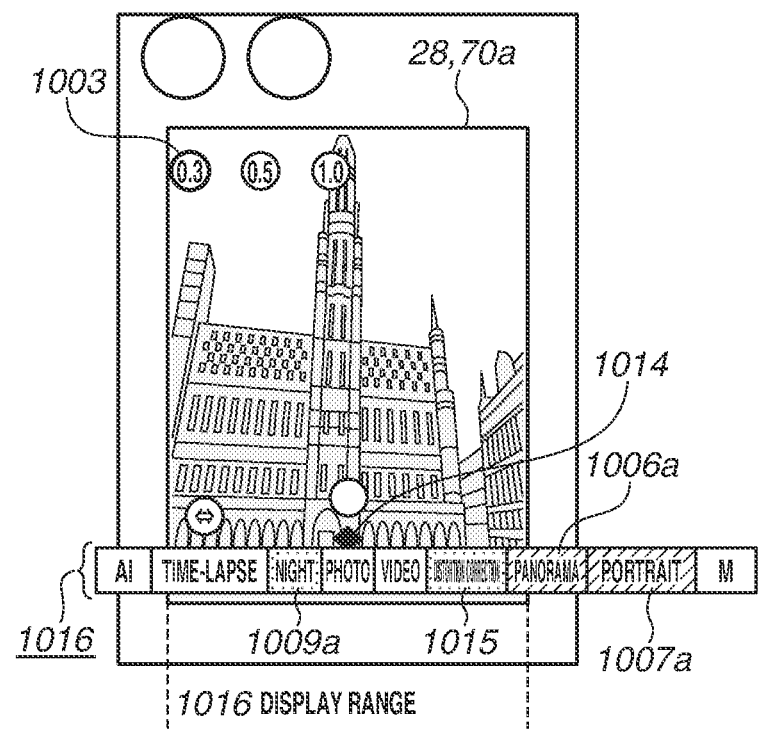
FIG. 10C is a diagram illustrating an example of display in image capturing mode selection processing.

In step S815, the system control unit 50 highlights an image capturing mode suitable for image capturing performed using the super-wide-angle camera, and displays an unsuitable image capturing mode in the grayout state. FIG. 10C illustrates a display example of the display unit 28 to be displayed in a case where a lens is switched to the super-wide-angle lens in the photo mode. As illustrated in FIG. 10C, the item 1009a indicating the night mode and an item 1015 indicating a distortion correction mode are displayed in such a manner as to be distinguishable from the other items (i.e., 1005, 1010). In addition, the item 1007a indicating the portrait mode and an item 1006a indicating the panorama mode are displayed in the grayout state. The grayout state indicates that image capturing in the portrait mode or the panorama mode is not to be performed when the super-wide-angle lens is selected. In other words, in a case where the super-wide-angle lens is selected in the photo mode, the user is highly likely to earnestly desire to perform image capturing using the super-wide-angle lens. Thus, by presenting an image capturing mode suitable for image capturing performed using the super-wide-angle lens, to the user in an easy-to-understand manner, the user can swiftly switch an image capturing mode. In addition, by displaying, in the grayout state, image capturing modes that disable image capturing performed using the super-wide-angle lens, the user can recognize that, if the image capturing modes in the grayout state are selected, image capturing performed using the super-wide-angle lens becomes inexecutable. In the image capturing performed using the super-wide-angle lens, distortion can occur in the vicinity of the end of an image, and therefore image capturing in the distortion correction mode is executable. Thus, when the super-wide-angle lens is used, it is desirable to make the user easily recognize that image capturing in the distortion correction mode is executable and recommended. In addition, in the panorama mode, image composition might become inexecutable due to the occurrence of distortion in the vicinity of the end of an image, and therefore image capturing is not to be performed. In step S816, the system control unit 50 determines whether a current lens is the standard lens. In a case where it is determined that a currently used lens is the standard lens (YES in step S816), the processing proceeds to step S824. In step S824, the system control unit 50 performs processing of switching an image capturing mode that is to be performed in a case where all image capturing modes are selectable. In a case where it is determined that a currently used lens is not the standard lens (NO in step S816), the processing proceeds to step S817. In step S817, the system control unit 50 performs processing of switching an image capturing mode that is to be performed in a case where a part of image capturing modes are unselectable.

In step S817, the system control unit 50 determines whether the user has issued an instruction to scroll the item group 1016 indicating image capturing modes. In a case where it is determined that the user has issued an instruction to scroll the item group 1016 indicating image capturing modes (YES in step S817), the processing proceeds to step S818. In a case where it is determined that the user has not issued an instruction to scroll the item group 1016 indicating image capturing modes (NO in step S818), the processing proceeds to step S819.

Figure 11A:
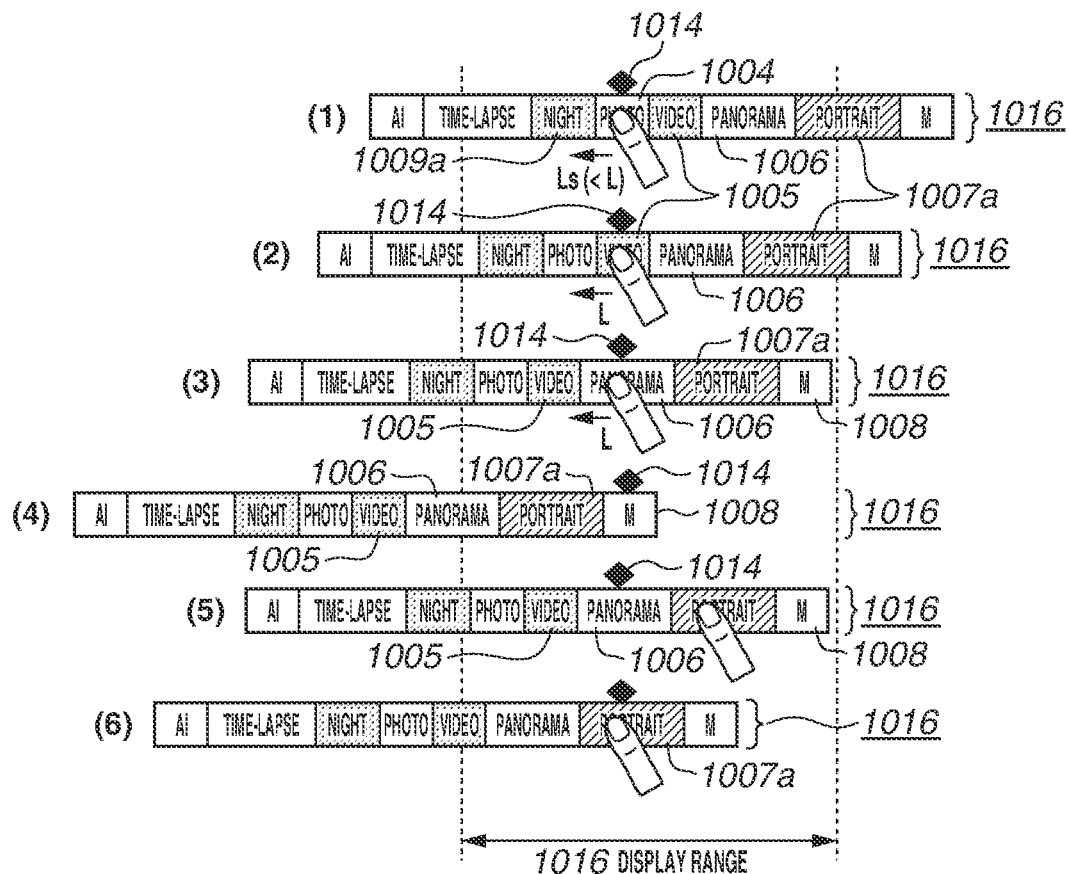
FIG. 11A is a diagram illustrating an example of display in image capturing mode selection processing.

In step S818, the system control unit 50 changes an image capturing mode to a selectable image capturing mode existing at a position closest to the currently selected image capturing mode, among image capturing modes existing in a scroll direction. FIG. 11A is a diagram illustrating selection of an image capturing mode that is to be made in a case where the wide-angle lens is selected. As illustrated in (2) in FIG. 11A, if a currently selected image capturing mode is the video mode, when the item group 1016 is scrolled by a distance L in a left direction extending along the short direction of the display unit 28, the item 1006 (panorama mode) existing in the right direction when viewed from the item 1005, and being selectable is selected. As illustrated in (1) in FIG. 11A, if a currently selected image capturing mode is the photo mode, the item 1005 is selected in accordance with the item group 1016 being scrolled in the left direction by a distance Ls smaller than the distance L. The item 1005 corresponds to the video mode. By a scroll amount smaller than a normal amount, the photo mode can be switched to the video mode being an image capturing mode recommended for image capturing performed using the wide-angle lens. As illustrated in (3), in a case where the panorama mode is selected, if the user issues an instruction to scroll the item group 1016 in the left direction, the neighboring portrait mode is normally selected, but if the panorama mode switches to the portrait mode, image capturing performed using the wide-angle lens becomes inexecutable. Thus, even if the item group 1016 is scrolled in the left direction by the distance L, the item 1007 indicating the portrait mode in the grayout state is not selected (skipped). Then, the item 1008 indicating the manual mode being a selectable image capturing mode existing at a closest position in the left direction when viewed from the item 1006 is selected.

Figure 11B:
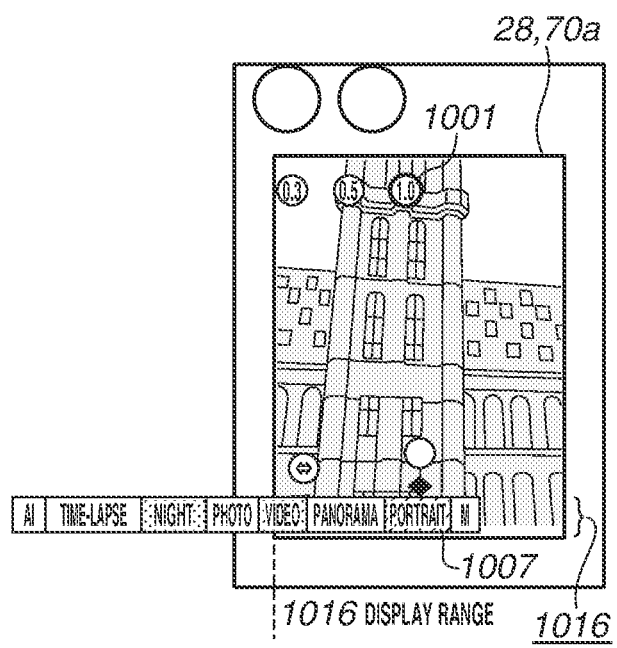
FIG. 11B is a diagram illustrating an example of display in image capturing mode selection processing.

In step S819, the system control unit 50 determines whether any of the items indicating the image capturing modes has been touch-selected. In other words, the system control unit 50 determines whether an operation (tap operation) of touching any of the items 1004 to 1011, and detaching the touch without moving a touch position, within a predetermined time being a short time, such as 0.5 seconds or 0.2 seconds, has been performed. In a case where it is determined that an item indicating an image capturing mode has been touch-selected (YES in step S819), the processing proceeds to step S820 because an image capturing mode is switched even in a case where image capturing performed using the selected lens is inexecutable. In step S820, a touched image capturing mode is selected. In FIG. 11A, (5) illustrates a state in which the user performs a tap operation on the item 1007a corresponding to the portrait mode. When the wide-angle lens is selected, image capturing in the portrait mode is inexecutable, but if the item 1007a is tapped, a state in which the item 1007a is selected as illustrated in (6) can be caused. That is, the image capturing mode can be switched to the portrait mode. FIG. 11B illustrates a display example of the display unit 28 to be displayed after the portrait mode is selected. As illustrated in FIG. 11B, it can be seen that an image capturing magnification indicated by the item 1001 is 1.0×, and the wide-angle lens has been switched to the standard lens.

In step S821, the system control unit 50 determines whether the image capturing mode selected by the operation in step S819 is an image capturing mode for image capturing executable only by the standard lens. That is, the system control unit 50 determines whether the image capturing mode is an image capturing mode for image capturing inexecutable by the wide-angle lens and the super-wide-angle lens, like the portrait mode. If the image capturing mode is an image capturing mode for image capturing executable only by the standard lens (YES in step S821), the processing proceeds to step S802. In step S802, the system control unit 50 performs processing of switching to the standard lens. If the image capturing mode is not an image capturing mode for image capturing executable only by the standard lens (NO in step S821), the processing proceeds to step S822.

In step S822, the system control unit 50 determines whether the image capturing mode selected by the operation in step S819 is an image capturing mode for image capturing executable by the wide-angle lens. That is, the system control unit 50 determines whether the image capturing mode is an image capturing mode for image capturing executable by the standard lens and the wide-angle lens, but inexecutable only by the super-wide-angle lens, like the panorama mode. Even in a case where the image capturing mode is an image capturing mode for image capturing inexecutable by the super-wide-angle lens, if the super-wide-angle lens is switched to the standard lens, a change in field angle becomes large. Thus, it is determined whether image capturing performed using the wide-angle lens is executable, and if image capturing performed using the wide-angle lens is executable (YES in step S822), the processing proceeds to step S807. In step S807, the super-wide-angle lens is switched to the wide-angle lens. With this configuration, it becomes possible to execute image capturing in an image capturing mode selected by the user, while preventing a change in field angle from getting larger. In a case where the image capturing mode is not an image capturing mode for image capturing executable by the wide-angle lens (NO in step S822), the processing proceeds to step S823.

Figure 10D:
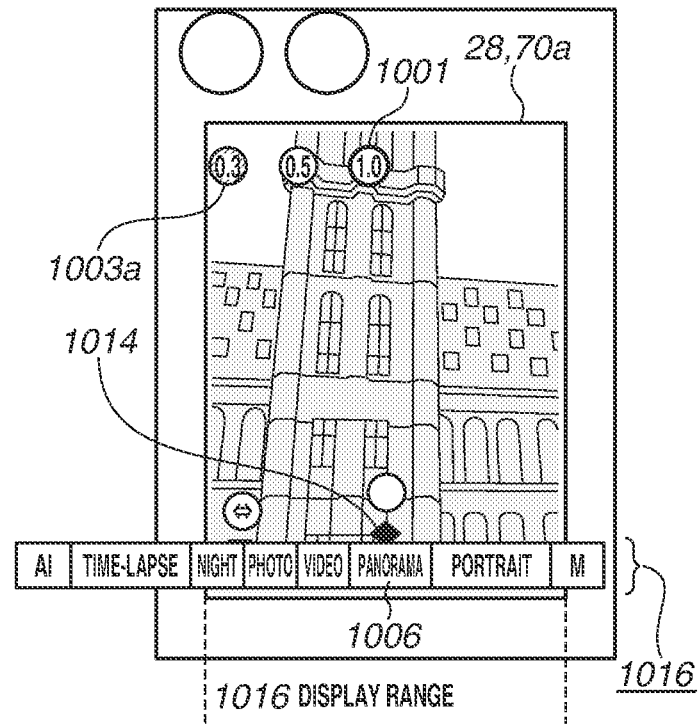
FIG. 10D is a diagram illustrating an example of display in image capturing mode selection processing.
Figure 10E:
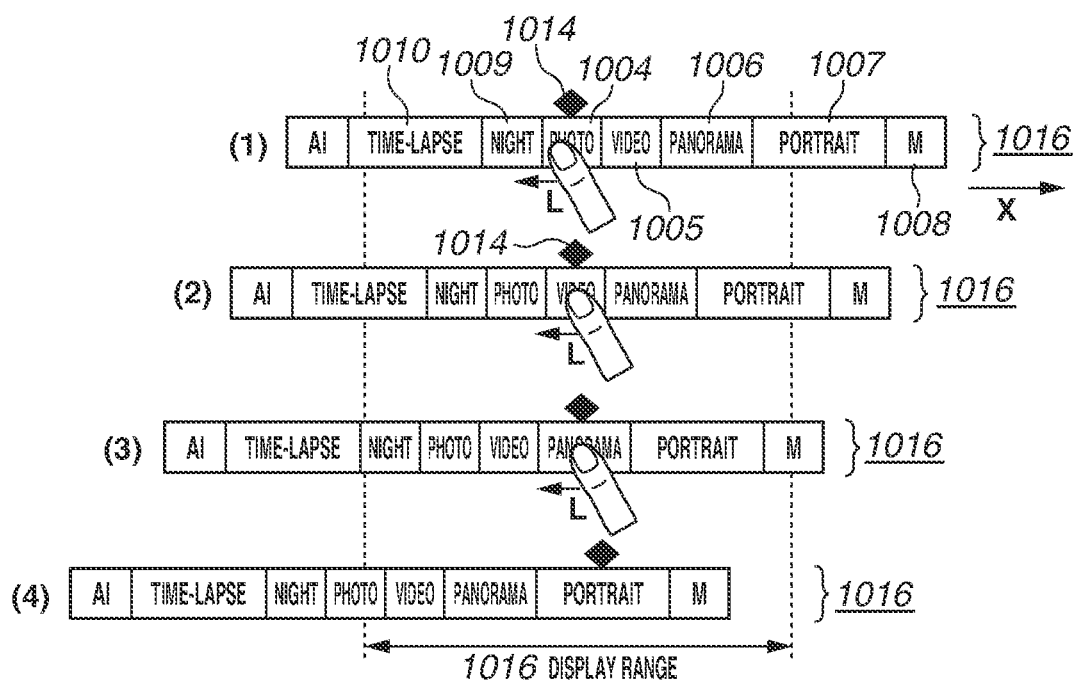
FIG. 10E is a diagram illustrating an example of display in image capturing mode selection processing.

In step S823, the system control unit 50 displays lenses selectable in the selected image capturing mode, in a distinguishable manner. FIG. 10D illustrates a display example to be displayed in a case where the panorama mode is selected, an item 1003a indicating the super-wide-angle lens is displayed in the grayout state, and the item 1002 indicating the wide-angle lens and the item 1001 indicating the standard lens are displayed without being grayed out. The user can thereby recognize that the super-wide-angle lens is unselectable in the panorama mode.

In step S824, the system control unit 50 performs processing similar to the processing in step S817.

In step S825, the system control unit 50 selects a neighboring item in the scroll direction when being viewed from the item corresponding to the selected image capturing mode, each time a scroll instruction is issued. In step S818, an image capturing mode selectable when a scroll operation is performed is selected, and an unselectable image capturing mode is skipped without being selected. In contrast, in step S825, a neighboring image capturing mode is selected each time scroll is performed by the distance L. FIG. 11A is a diagram illustrating switching of an image capturing mode that is performed in a case where scroll is performed by the distance L. In (1) to (4), each time the user scrolls the item group 1016 in the left direction by the distance L, an item corresponding to an image capturing mode existing immediately below the mark 1014 switches to an item on the right side one by one. Because a display position of the mark 1014 on the display unit 28 remains unchanged, items displayed in a display unit are items corresponding to modes from the time-lapse mode to the portrait mode in (1), and the items change to items corresponding to modes from the video mode to the manual mode in (6).

The processing in steps S824 to S827 is processing to be executed in a case where a selected lens is the standard lens, or in a case where a lens is switched to the wide-angle lens or the super-wide-angle lens in a mode other than the photo mode. In other words, if a selected lens is the standard lens, all image capturing modes are selectable, and thus there is no need to make a specific image capturing mode difficult to be selected. In addition, if the user has not switched the lens to the wide-angle lens or the super-wide-angle lens from the standard lens selected at the time of start-up, the user is highly likely to intend to select a lens after selecting an image capturing mode. Thus, all image capturing modes are displayed in a parallel relationship (a partial image capturing mode is not highlighted or displayed in the grayout state). Furthermore, a partial image capturing mode is not made difficult to be selected. With this configuration, the user who desires to select a lens after selecting an image capturing mode can select an image capturing mode and a lens with good operability.

In step S828, the system control unit 50 determines whether an image capturing instruction has been issued. The image capturing instruction can be issued by a touch operation on the item 1012. In a case where it is determined that an image capturing instruction has been issued (YES in step S828), the processing proceeds to step S829. In a case where it is determined that an image capturing instruction has not been issued (NO in step S828), the processing proceeds to step S830.

In step S829, the system control unit 50 performs image capturing processing. The system control unit 50 records a captured image onto the recording medium 200.

In step S830, the system control unit 50 determines whether an instruction to switch to the front camera has been issued. The instruction to switch to the front camera (i.e., second surface) can be issued by a touch operation on the item 1013. In a case where it is determined that an instruction to switch to the front camera has been issued (YES in step S830), the processing proceeds to the image capturing mode selection processing of the front camera that is illustrated in FIG. 9. In a case where it is determined that an instruction to switch to the front camera has not been issued (NO in step S830), the processing proceeds to step S831.

In step S831, the system control unit 50 determines whether to end the camera function. An instruction to end the camera function can be issued by pressing the power switch 72, an operation of scrolling the display unit 28 upward, or a pinch operation of pinching a live view image. In a case where it is determined that an instruction to end the camera function has been has been issued (YES in step S831), the processing illustrated in FIGS. 8A to 8C ends. In a case where it is determined that an instruction to end the camera function has not been issued (NO in step S831), the processing proceeds to step S832.

In step S832, the system control unit 50 determines whether an instruction to switch the rear camera to the standard lens has been issued. The instruction to switch to the standard lens can be issued by a touch operation on the item 1001. In a case where it is determined that an instruction to switch to the standard lens has been issued (YES in step S832), the processing proceeds to step S802. In a case where it is determined that an instruction to switch to the standard lens has not been issued (NO in step S832), the processing proceeds to step S833.

In step S833, the system control unit 50 determines whether a currently selected lens is the standard lens. In a case where it is determined that a currently selected lens is the standard lens (YES in step S833), the processing proceeds to step S806. In a case where it is determined that a currently selected lens is not the standard lens (NO in step S833), the processing proceeds to step S817.

Next, the image capturing mode selection processing of the front camera according to the present exemplary embodiment will be described with reference to the flowchart in FIG. 9. The processing is implemented by loading a program recorded on the nonvolatile memory 56, onto the system memory 52, and the system control unit 50 executing the program. The processing starts when it is determined in step S830 of FIG. 8C that an instruction to switch to the front camera has been issued (YES in step S830).

In step S901, the system control unit 50 starts up the standard lens of the front camera. In other words, the system control unit 50 starts up the standard lens among lenses of the front camera on the second surface. That is, the system control unit 50 starts up the camera of the lens unit 201.

In step S902, the system control unit 50 sequentially displays, on the display unit 28, captured images acquired via the lens unit 201 (live view image).

Figure 11C:
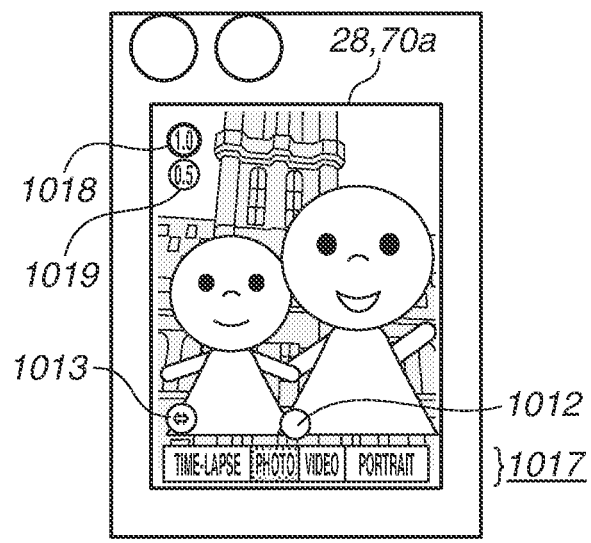
FIG. 11C is a diagram illustrating an example of display in image capturing mode selection processing.

In step S903, the system control unit 50 displays, on the display unit 28, an item group 1017 including the photo mode, the video mode, and the portrait mode. FIG. 11C illustrates an example of a display example to be displayed in a case where the standard lens is started up. When the front camera is started up, the user is highly likely to perform image capturing while regarding himself/herself as a subject, and thus the number of selectable image capturing modes is limited as compared with a case where the rear camera is selected.

In step S904, the system control unit 50 determines whether an instruction to switch the lens of the front camera to the wide-angle lens has been issued. The instruction to switch to the wide-angle lens can be issued by a touch operation on an item 1019. In a case where it is determined that an instruction to switch to the wide-angle lens has been issued (YES in step S904), the processing proceeds to step S905. In a case where it is determined that an instruction to switch to the wide-angle lens has not been issued (NO in step S904), the processing proceeds to step S907.

In step S905, the system control unit 50 starts up the wide-angle lens of the front camera. In other words, the system control unit 50 starts up the wide-angle lens among lenses of the front camera on the second surface. That is, the system control unit 50 starts up the camera of the lens unit 202.

Figure 11D:
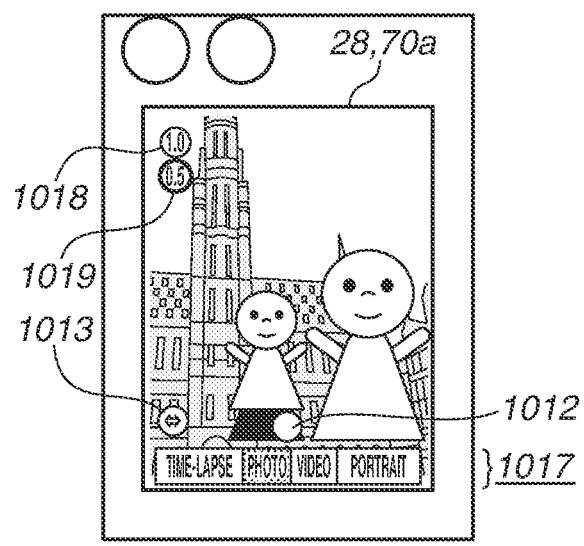
FIG. 11D is a diagram illustrating an example of display in image capturing mode selection processing.

In step S906, the system control unit 50 sequentially displays, on the display unit 28, captured images acquired via the lens unit 202 (live view image). FIG. 11D illustrates a display example of the display unit 28 to be displayed when the wide-angle lens of the front camera is started up. In the case of the front camera, the standard lens and the wide-angle lens are provided, and image capturing modes for image capturing executable by the standard lens and image capturing modes for image capturing executable by the wide-angle lens are the same. In the case of the front camera, a range of a changeable field angle is not as large as that of the rear camera, and thus selectable image capturing modes are the same as well. Thus, there is no need to make a partial image capturing mode easily-selectable, or make a partial image capturing mode difficult to be selected.

In step S907, the system control unit 50 determines whether an instruction to switch the lens of the front camera to the standard lens has been issued. The instruction to switch to the standard lens can be issued by a touch operation on an item 1018. In a case where it is determined that an instruction to switch to the wide-angle lens has been issued (YES in step S907), the processing proceeds to step S901. In a case where it is determined that an instruction to switch to the wide-angle lens has not been issued (NO in step S907), the processing proceeds to step S908.

In step S908, the system control unit 50 determines whether an image capturing instruction has been issued. The image capturing instruction can be issued by a touch operation on the item 1012. In a case where it is determined that an image capturing instruction has been issued (YES in step S908), the processing proceeds to step S909. In a case where it is determined that an image capturing instruction has not been issued (NO in step S908), the processing proceeds to step S910.

In step S909, the system control unit 50 performs image capturing processing. The system control unit 50 records a captured image on the recording medium 200.

In step S910, the system control unit 50 determines whether an instruction to switch to the rear camera has been issued. The instruction to switch to the rear camera (i.e., lens on the first surface) can be issued by a touch operation on the item 1013. In a case where it is determined that an instruction to switch to the rear camera has been issued (YES in step S910), the processing proceeds to step S802. In step S802, the system control unit 50 starts up the standard lens of the rear camera. In a case where it is determined that an instruction to switch to the rear camera has not been issued (NO in step S910), the processing proceeds to step S911.

In step S911, the system control unit 50 determines whether to end the camera function. An instruction to end the camera function can be issued by pressing the power switch 72, an operation of scrolling the display unit 28 upward, or a pinch operation of pinching a live view image. In a case where it is determined that an instruction to end the camera function has been issued (YES in step S911), the processing illustrated in FIG. 9 ends. In a case where it is determined that an instruction to end the camera function has not been issued (NO in step S911), the processing proceeds to step S912.

Figure 8A:
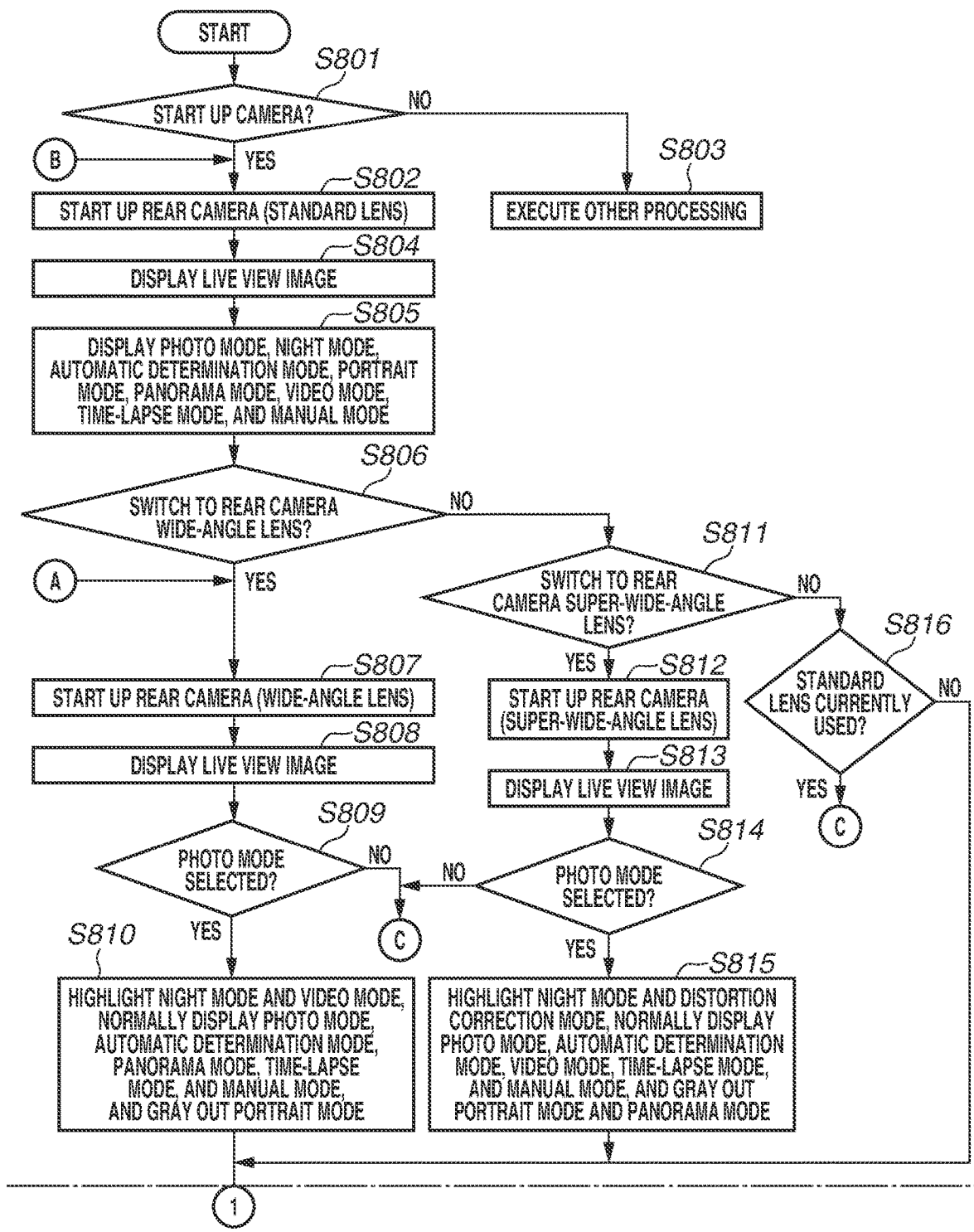
FIG. 8A is a flowchart illustrating image capturing mode selection processing according to the present exemplary embodiment.
Figure 8B:
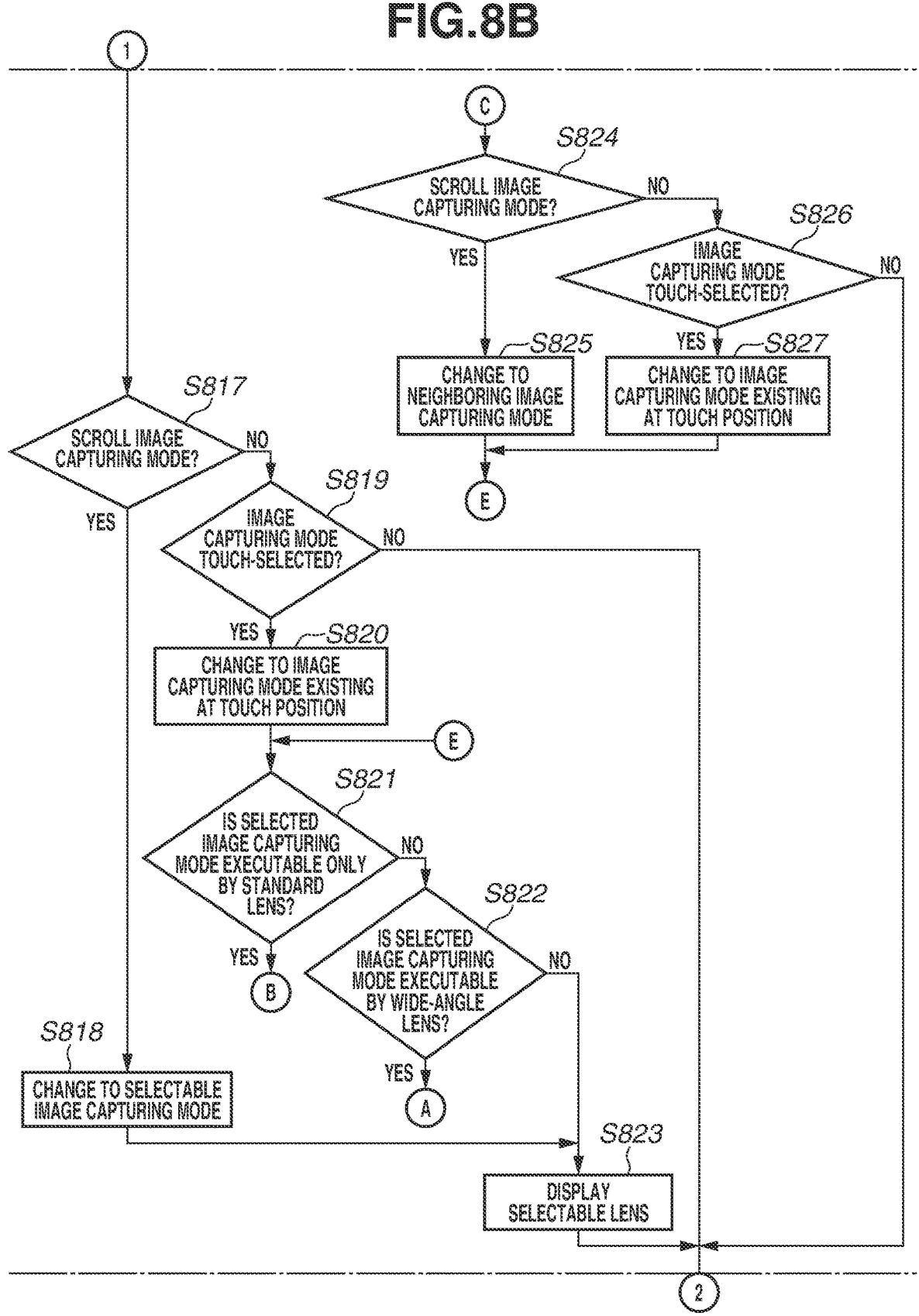
FIG. 8B is a flowchart illustrating image capturing mode selection processing according to the present exemplary embodiment.
Figure 8C:
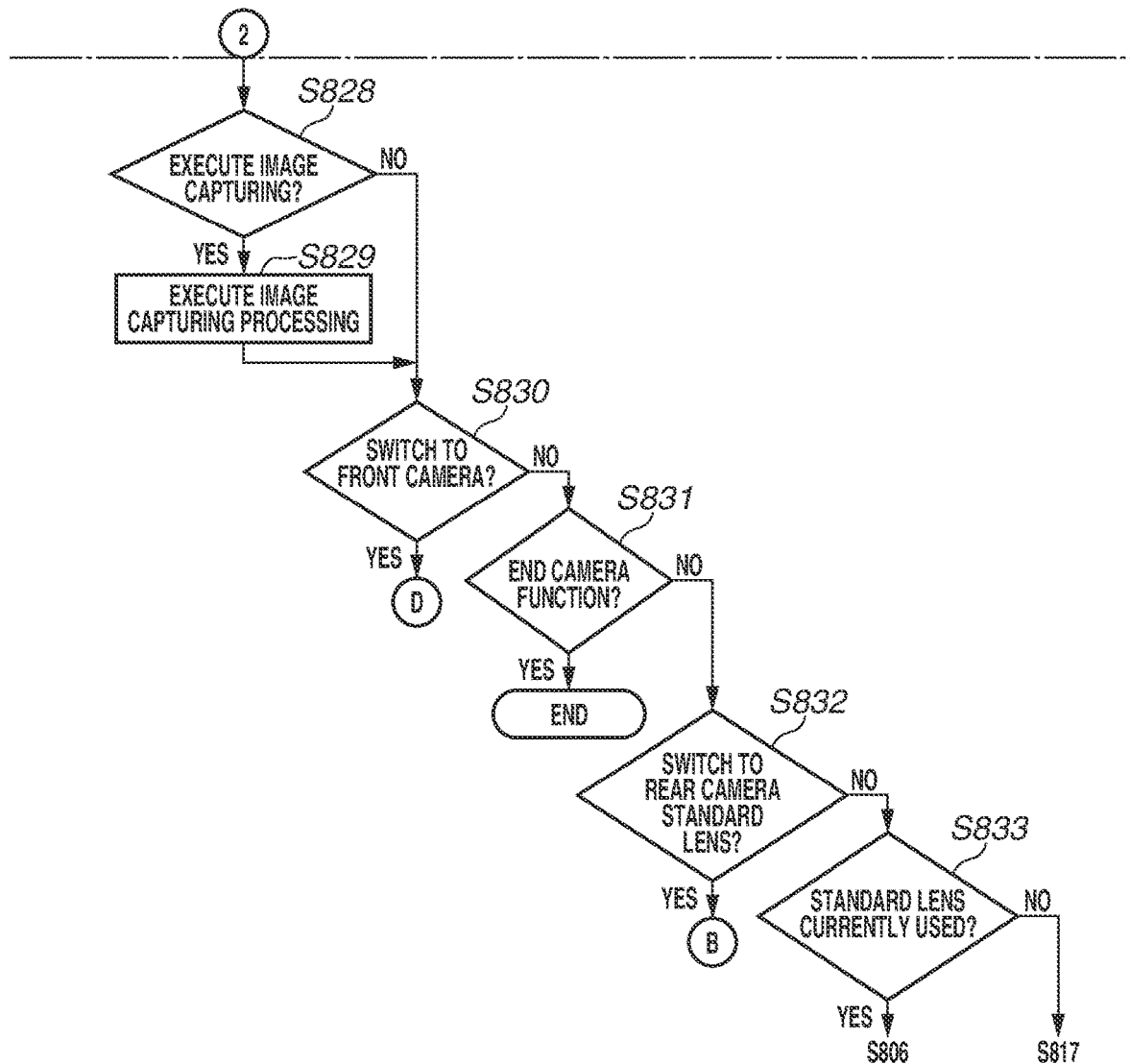
FIG. 8C is a flowchart illustrating image capturing mode selection processing according to the present exemplary embodiment.

The processing in steps S912 to S915 is processing similar to the processing in steps S824 to S827 of FIG. 8B. Nevertheless, if the processing in step S913 or S915 ends, the processing proceeds to step S908.

In step S916, the system control unit 50 determines whether a currently selected lens is the standard lens. In a case where it is determined that the currently selected lens is the standard lens (YES in step S916), the processing proceeds to step S904. In a case where it is determined that the currently selected lens is not the standard lens (NO in step S916), the processing proceeds to step S907.

According to the above-described exemplary embodiment, it becomes easier for the user to recognize an image capturing mode for image capturing executable when a selected lens is used. In other words, because a recommended image capturing mode and an unrecommended image capturing mode, which is a mode where a lens switches if being selected, for a lens selected in the photo mode are displayed in a distinguishable manner, the user can swiftly recognize an image capturing mode recommended to be selected in a selected field angle. By avoiding hiding an unrecommended image capturing mode, the user can swiftly perform selection without performing a switch operation of a lens, in a case where the user considers in midstream to desire to prioritize the feature of an image capturing mode over a field angle in image capturing.

In the above-described exemplary embodiment, the description has been given of an example in which, in a case where an image capturing mode switches to an image capturing mode for image capturing inexecutable by a lens selected in the photo mode, a lens that executes image capturing is switched to a lens that can execute image capturing. Nevertheless, in a case where the user has switched a lens in the photo mode, the user is highly likely to earnestly desire to perform image capturing at a field angle selected by the user, and thus a selected image capturing mode may be selected without changing the field angle. Nevertheless, if the wide-angle lens is used, a blurring effect of a background might become less recognizable, for example, in the portrait mode, and thus the user is notified that the background is not blurred unless the lens is switched to the standard lens.

In a case where the user sets the number of pixels to a high value in the camera function, in some cases, image capturing is performed using the wide-angle lens, and image capturing performed using the standard lens becomes inexecutable. In a case where the user sets, on a menu screen or a setting screen of the camera function, the number of pixels to a value equal to or larger than a predetermined value (i.e., sets the number of pixels to a value equal to or larger than the number of pixels at which image capturing is inexecutable unless the wide-angle lens is used), the following operation is performed. More specifically, an image capturing mode for image capturing executable by the wide-angle lens or the super-wide-angle lens among lenses of the rear camera is highlighted, and an image capturing mode for image capturing inexecutable by the wide-angle lens or the super-wide-angle lens is displayed in the grayout state. The user is also notified that, in a case where the user tries to select, by a tap operation, the image capturing mode displayed in the grayout state, a lens switches and the number of pixels further decreases. In a case where the user switches an image capturing mode after checking the notification, image capturing is performed after decreasing the number of pixels and switching the lens to the standard lens. It may be only required that a recommended partial image capturing mode is highlighted without graying out an unrecommended image capturing mode. In contrast, an unrecommended partial image capturing mode may be grayed out, and a recommended image capturing mode may be highlighted. In addition, when a newly-selected lens is used, a display mode of an unrecommended or recommended image capturing mode is changed to the grayout state or a highlighted state in accordance with the lens being selected.

When an image capturing mode is switched to an image capturing mode for image capturing inexecutable by the wide-angle lens even if the user who has selected the wide-angle lens does not intend to switch the lens to the standard lens, it is possible to prevent a field angle of a live view image from changing. In other words, it is possible to enhance the visibility for the user by preventing a field angle of a live view image from changing to a field angle of the standard lens or returning to a field angle of the wide-angle lens without the intention of the user in accordance with a change of an image capturing mode, when the user is still selecting an image capturing mode.

To indicate a selected image capturing mode, a display mode of an item corresponding to the selected image capturing mode among items in the item group 1016 may be changed. For example, a size of the item may be increased, the color of a character may be changed, or the color of the item may be changed. An item corresponding to a selected image capturing mode, an item corresponding to an unrecommended image capturing mode, and an item corresponding to a recommended image capturing mode are displayed in different display modes. All of these items are displayed in display modes different from a display mode of an image capturing mode that is not selected, and is neither recommended nor unrecommended. In other words, in accordance with a lens being selected, a display mode of an item corresponding to an image capturing mode for image capturing inexecutable by the selected lens is changed to a display mode less noticeable than other unselected items. Alternatively, a display mode of an item corresponding to an image capturing mode recommended for the selected lens is changed to a display mode more noticeable than other unselected items.

In the camera function, the user is sometimes enabled to set whether to store an image capturing setting set when the camera function is started up lastly. At this time, in a case where the user prefers to store the lastly-used image capturing setting, the user is highly likely to earnestly desire that an image capturing setting that has been once set is not to be changed. Thus, image capturing modes are displayed based on a lens selected in the photo mode. In other words, a recommended image capturing mode and an unrecommended image capturing mode for the lens selected in the photo mode are made recognizable. In contrast, the user who prefers not to store the lastly-used image capturing setting is highly likely to earnestly desire to prioritize a latest setting. Thus, even if a lens has already been switched, the user is highly likely to desire to prioritize image capturing in an image capturing mode currently selected over the type of a set lens, and therefore a recommended image capturing mode and an unrecommended image capturing mode are not displayed in a recognizable manner in accordance with the lens.

The focal lengths and measures of image capturing field angles of the standard lens, the wide-angle lens, and the super-wide-angle lens of the rear camera and the front camera, which have been described above with reference to FIGS. 3A, 3B, 4A and 4B, are examples, and are not limited to these. The description has been given of an example in which three types of lenses are arranged on the rear camera and two types of lenses are arranged on the front camera, but the numbers of types are not limited to these, and may be three types or one type may be arranged.

The above-described various types of control described to be performed by the system control unit 50 may be performed by one piece of hardware, or the entire apparatus may be controlled by a plurality of pieces of hardware (e.g., central processing units (CPUs), micro processing units (MPUs), and dedicated circuits) sharing the processing.

The preferred exemplary embodiments of the present invention have been described in detail, but the present invention is not limited to these specific exemplary embodiments, and various configurations are also included in the present invention without departing from the spirit of the invention. Furthermore, each of the above-described exemplary embodiments merely indicates an exemplary embodiment of the present invention, and the exemplary embodiments can be appropriately combined.

In the above-described exemplary embodiment, an example case where the present invention is applied to a smartphone has been described. An application example of the present invention is not limited to this example, and the present invention can be applied to any electronic device as long as the electronic device performs image capturing while switching between a plurality of lenses having different focal lengths. More specifically, the present invention can be applied to a digital camera, a portable image viewer, a printer apparatus including a viewfinder, a digital photo frame, a music player, a game machine, and an electronic book reader.

Other Exemplary Embodiment

An exemplary embodiment of the present invention is also implemented by executing the following processing. More specifically, the processing is processing of supplying software (program) implementing the functions of the above-described exemplary embodiment, to a system or an apparatus via a network or various recording media, and a computer (or CPU, MPU, etc.) of the system or the apparatus reading a program code and executing the program code. In this case, the program and a nonvolatile storage medium storing the program are included in the present invention.

The present invention is not limited to the above exemplary embodiments and various changes and modifications can be made without departing from the spirit and scope of the present invention. Therefore, to apprise the public of the scope of the present invention, the following claims are appended.

According to the present invention, it becomes possible to set a field angle with good operability in a case where a photographer itself serves as a subject.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device having a first surface and a second surface, the electronic device comprising:
   at least one memory storing instructions; and
   at least one processor that is in communication with the at least one memory and that, when executing the instructions, cooperates with the at least one memory to execute processing, the processing including:
   controlling image capturing to be performed in first image capturing or second image capturing, wherein image capturing performed in the first image capturing uses any lens among a plurality of lenses including a first lens and a second lens that are arranged on the first surface, the second lens having a field angle wider than a field angle of the first lens, and wherein image capturing performed in the second image capturing uses any lens among a plurality of lenses including a third lens and a fourth lens that are arranged on the second surface, the fourth lens having a field angle wider than a field angle of the third lens and wider than the field angle of the first lens;
   receiving, during the second image capturing, a first instruction to switch to the first image capturing;
   receiving, during the first image capturing, a second instruction to switch to the second image capturing;
   in a case where the first instruction is received during the second image capturing using the fourth lens, controlling to switch to the first image capturing using the first lens, controlling the image captured using the first lens to be displayed on a display, and controlling an image capturing magnification to be displayed, on the display, as 1× during the first image capturing using the first lens; and
   in a case where the second instruction is received during the first image capturing using the first lens, controlling to switch to the second image capturing using the fourth lens, controlling the image captured using the fourth lens to be displayed on the display, and controlling the image capturing magnification to be displayed, on the display, as 1× during the second image capturing using the fourth lens.

2. The electronic device according to claim 1, wherein the processing further includes:

switching image capturing performed in the first image capturing, between image capturing performed using the first lens and image capturing performed using the second lens, and controlling an image captured using the second lens to be displayed on the display.

3. The electronic device according to claim 1, wherein the processing further includes:

switching image capturing performed in the second image capturing, between image capturing performed using the third lens and image capturing performed using the fourth lens, and controlling an image captured using the third lens to be displayed on the display.

4. The electronic device according to claim 1, wherein a fifth lens having a narrower field angle in which image capturing is executable, than that of the first lens, is arranged on the first surface.

5. The electronic device according to claim 1, wherein the processing further includes:

in a case where image capturing during the first image capturing is switched to image capturing performed using the second lens, controlling an image captured using the second lens to be displayed on the display and the image capturing magnification to be displayed, on the display, as a value smaller than 1×.

6. The electronic device according to claim 2, wherein the processing further includes:

in accordance with a touch operation on a predetermined item on the display, controlling to switch image capturing to be performed during the first image capturing between image capturing performed using the first lens and image capturing performed using the second lens.

7. The electronic device according to claim 1, wherein the processing further includes:

in a case where image capturing during the second image capturing is switched to image capturing performed using the third lens, controlling an image captured using the third lens to be displayed on the display and the image capturing magnification to be displayed as a value larger than 1×.

8. The electronic device according to claim 3, wherein the processing further includes:

in accordance with a touch operation on a predetermined item on the display, controlling to switch image capturing to be performed during the second image capturing between image capturing performed using the third lens and image capturing performed using the fourth lens.

9. The electronic device according to claim 1, further comprising the display.

10. A control method of an electronic device in which a plurality of lenses including a first lens and a second lens having a field angle wider than a field angle of the first lens are arranged on a first surface, and a plurality of lenses including a third lens and a fourth lens having a wider field angle than a field angle of the third lens are arranged on a second surface, the control method comprising:

controlling image capturing to be performed in first image capturing performed using any lens among the plurality of lenses arranged on the first surface or in second image capturing performed using any lens among the plurality of lenses arranged on the second surface;

receiving a first instruction to switch to the first image capturing during the second image capturing using the fourth lens or receiving a second instruction to switch to the second image capturing during the first image capturing using the first lens; and in a case where the first instruction is received during the second image capturing using the fourth lens, controlling to switch to the first image capturing using the first lens, to display an image captured using the first lens on a display, and to display an image capturing magnification, on the display, as 1× during the first image capturing using the first lens; and in a case where the second instruction is received during the first image capturing using the first lens, controlling to switch to the second image capturing using the fourth lens, to display an image captured using the fourth lens on the display, and to display an image capturing magnification, on the display, as 1× during the second image capturing using the fourth lens.

11. A computer-readable storage medium storing computer-executable instructions for causing a computer that controls an electronic device having a first surface and a second surface to perform operations comprising:

controlling image capturing to be performed in first image capturing or second image capturing, wherein image capturing performed in the first image capturing uses any lens among a plurality of lenses including a first lens and a second lens that are arranged on the first surface, the second lens having a field angle wider than a field angle of the first lens, and wherein image capturing performed in the second image capturing uses any lens among a plurality of lenses including a third lens and a fourth lens that are arranged on the second surface, the fourth lens having a field angle wider than a field angle of the third lens;

receiving, during the second image capturing, a first instruction to switch to the first image capturing;

receiving, during the first image capturing, a second instruction to switch to the second image capturing;

in a case where the first instruction is received during the second image capturing using the fourth lens, controlling to switch to the first image capturing using the first lens, to display an image captured using the first lens on a display, and to display an image capturing magnification, on the display, as 1× during the first image capturing using the first lens; and in a case where the second instruction is received during the first image capturing using the first lens, controlling to switch to the second image capturing using the fourth lens, to display an image captured using the fourth lens on the display, and to display an image capturing magnification, on the display, as 1× during the second image capturing using the fourth lens.

12. A computer-readable storage medium storing a program for causing a computer to execute the control method of an electronic device according to claim 10.

13. The electronic device according to claim 1, wherein, among all lenses arranged on the second surface, including the third lens and the fourth lens, the field angle of the fourth lens is widest.

14. The electronic device according to claim 1, wherein the field angle of the fourth lens is wider than the field angle of the second lens.

15. The control method according to claim 10, wherein, among all lenses arranged on the second surface, including the third lens and the fourth lens, the field angle of the fourth lens is widest.

16. The computer-readable storage medium according to claim 11, wherein, among all lenses arranged on the second surface, including the third lens and the fourth lens, the field angle of the fourth lens is widest.

* * * * *